US006790141B2

(12) United States Patent
Muir

(10) Patent No.: US 6,790,141 B2
(45) Date of Patent: Sep. 14, 2004

(54) SEQUENTIAL GAMING

(75) Inventor: David Hugh Muir, Warnersbay (AU)

(73) Assignee: IGT, Reno, NV (US)

( * ) Notice: Subject to any disclaimer, the term of this patent is extended or adjusted under 35 U.S.C. 154(b) by 19 days.

(21) Appl. No.: 09/966,474

(22) Filed: Sep. 28, 2001

(65) Prior Publication Data

US 2003/0064769 A1 Apr. 3, 2003

(51) Int. Cl.[7] .................................................. A63F 13/00
(52) U.S. Cl. ................................ 463/42; 463/16; 463/1
(58) Field of Search .......................... 463/1, 29, 40–44; 700/91, 92

(56) References Cited

U.S. PATENT DOCUMENTS 4,764,666 A * 8/1988 Bergeron ..................... 463/25
4,837,728 A 6/1989 Barrie et al. ................ 364/412
5,038,022 A * 8/1991 Lucero ........................ 463/25
5,083,271 A * 1/1992 Thacher et al. ............... 700/92
5,265,874 A 11/1993 Dickinson et al. .......... 273/138
5,779,549 A * 7/1998 Walker et al. ................ 463/42
5,917,725 A * 6/1999 Thacher et al. ............... 700/91
6,286,834 B1 9/2001 Caputo ........................ 273/274
6,328,649 B1 12/2001 Randall et al. ............... 463/20

* cited by examiner

*Primary Examiner*—Teresa Walberg
*Assistant Examiner*—Aaron L. Enatsky
(74) *Attorney, Agent, or Firm*—Marshall, Gerstein & Borun LLP

(57) ABSTRACT

A gaming system includes a communication network, a portable data storage device having information associated with a player stored therein and a plurality of gaming units communicatively coupled to the communication network. Each of the gaming units includes an interface for reading and for storing information within the portable data storage device. The gaming system also includes a network computer communicatively coupled to the communication network and the plurality of gaming units. The network computer is programmed to enable the player to play a group of the plurality of gaming units in a particular sequence based on the information associated with the player stored within the portable data storage device.

20 Claims, 16 Drawing Sheets

FIG. 10
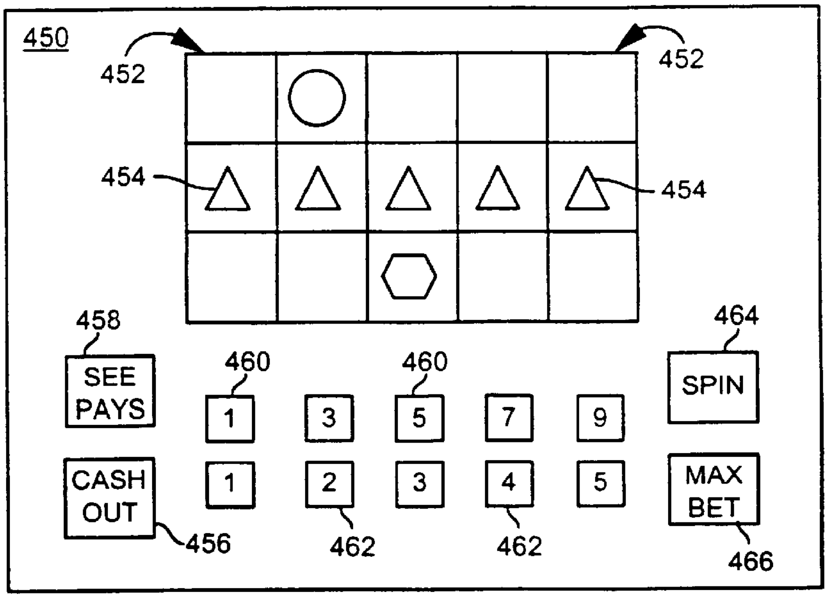
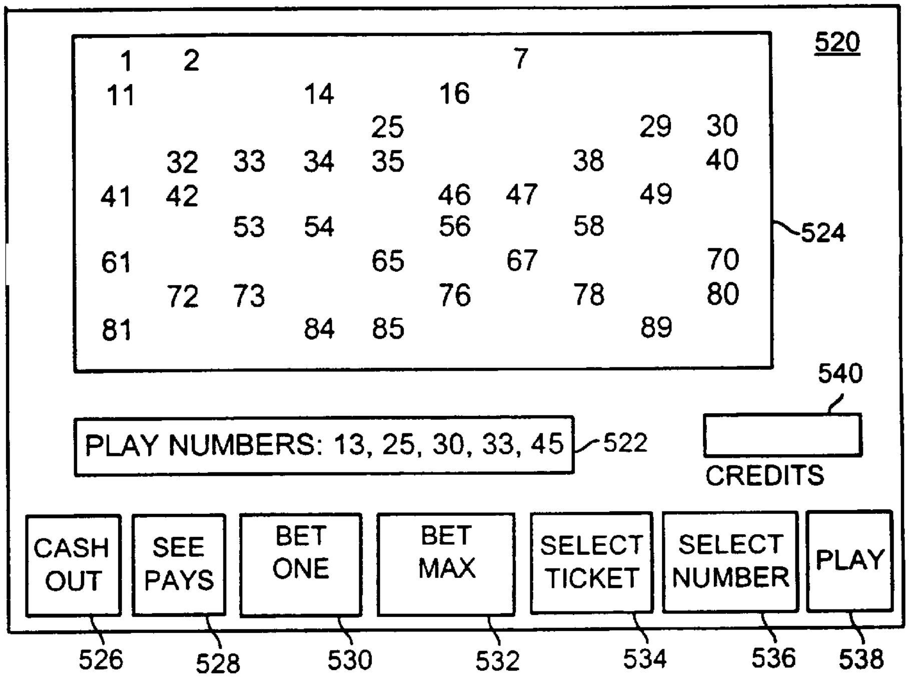
FIG. 11

SEQUENTIAL GAMING

BACKGROUND OF THE INVENTION

This invention relates to gaming systems and methods and, more particularly, this invention relates to sequential gaming systems and methods.

Incentives such as, for example, extended play, bonuses, etc. are well known manners of enticing gaming patrons or players to continue play on a particular electronic gaming device. Unfortunately, these simple incentive techniques do not effectively encourage players to play multiple gaming devices. To the contrary, these incentives are typically designed to encourage players to repeatedly play a particular gaming device at a particular venue. As a result, known gaming systems and methods make it very difficult for casino operators and the like to encourage or to promote the use of a wide variety of gaming activities by casino patrons, particularly new gaming activities or machines with which players are not generally familiar. Furthermore, existing gaming systems and methods do not generally enable a particular casino or venue to establish promotional activities or to establish incentives to engage in gaming activities at multiple venues or casinos, some or all of which may be owned by different business entities and some or all of which may be geographically dispersed. In other words, known gaming systems and methods typically do not enable venues or casino operators to establish more complex player incentives and promotional activities that involve interrelationships between multiple gaming activities and interrelationships between multiple venues.

SUMMARY OF THE INVENTION

A gaming system may include a communication network, a portable data storage device having information associated with a player stored therein and a plurality of gaming units communicatively coupled to the communication network. Each of the gaming units may include an interface for reading and for storing information within the portable data storage device. The gaming system may also include a network computer communicatively coupled to the communication network and the plurality of gaming units. The network computer may be programmed to enable the player to play a group of the plurality of gaming units in a particular sequence based on the information associated with the player stored within the portable data storage device.

In accordance with another aspect, a gaming system may include a communication network, a portable data storage device having gaming information stored therein and a plurality of gaming activities communicatively coupled to the communication network. Each of the gaming activities may include an interface for accessing the gaming information in the portable data storage device. Additionally, a server may be communicatively coupled to the communication network and the plurality of gaming activities. The server may be programmed to direct the player to play a group of the plurality of gaming activities in a sequence based on the gaming information stored on the portable data storage device.

In yet another aspect, a gaming device may include a memory, a video display, an input device and a processor communicatively coupled to the memory, the video display and the processor. The processor may be programmed to receive information pertaining to a player via the input device and to send a portion of the received information to a computer via a communication network. The processor may be programmed to perform a video gambling game in accordance with a sequence of gaming activities that is generated by the computer based on the received information.

In still another aspect, a method of gaming may read data pertaining to a player from a portable data storage device that is proximate to a gaming unit, send a portion of the data pertaining to the player to a system server via a communication network, and determine a gaming sequence. The method may also send configuration information based on the gaming sequence from the system server to the gaming unit via the communication network, initiate play of a game that is part of the gaming sequence and perform a win evaluation of the game upon completion of the game. Still further, the method may accumulate win data associated with game, send the accumulated win data to the system server via the communication network and determine at the system server whether the gaming sequence has been completed based on the accumulated win data. Additionally, the method may provide a clue to the player based on progress of the player through the gaming sequence.

In still another aspect, a method of gaming may receive player information from one of a plurality of networked gaming activities, generate a gaming sequence based on the received player information and send configuration information based on the generated gaming sequence to the one of the plurality of networked gaming activities. Further, the method may receive accumulated win information from the one of the plurality of networked gaming activities and send information pertaining to a next gaming activity in the generated gaming sequence to the one of the plurality of networked gaming activities.

The features and advantages of the present invention will be apparent to those of ordinary skill in the art in view of the detailed description of various embodiments, which is made with reference to the drawings, a brief description of which is provided below.

BRIEF DESCRIPTION OF THE DRAWINGS

FIG. 10 depicts an exemplary video display that may be provided to a player during performance of the slots routine of FIG. 12;

FIG. 11 depicts an exemplary video display that may be provided to a player during performance of the video keno routine of FIG. 13;

DETAILED DESCRIPTION OF VARIOUS EMBODIMENTS

Figure 1:
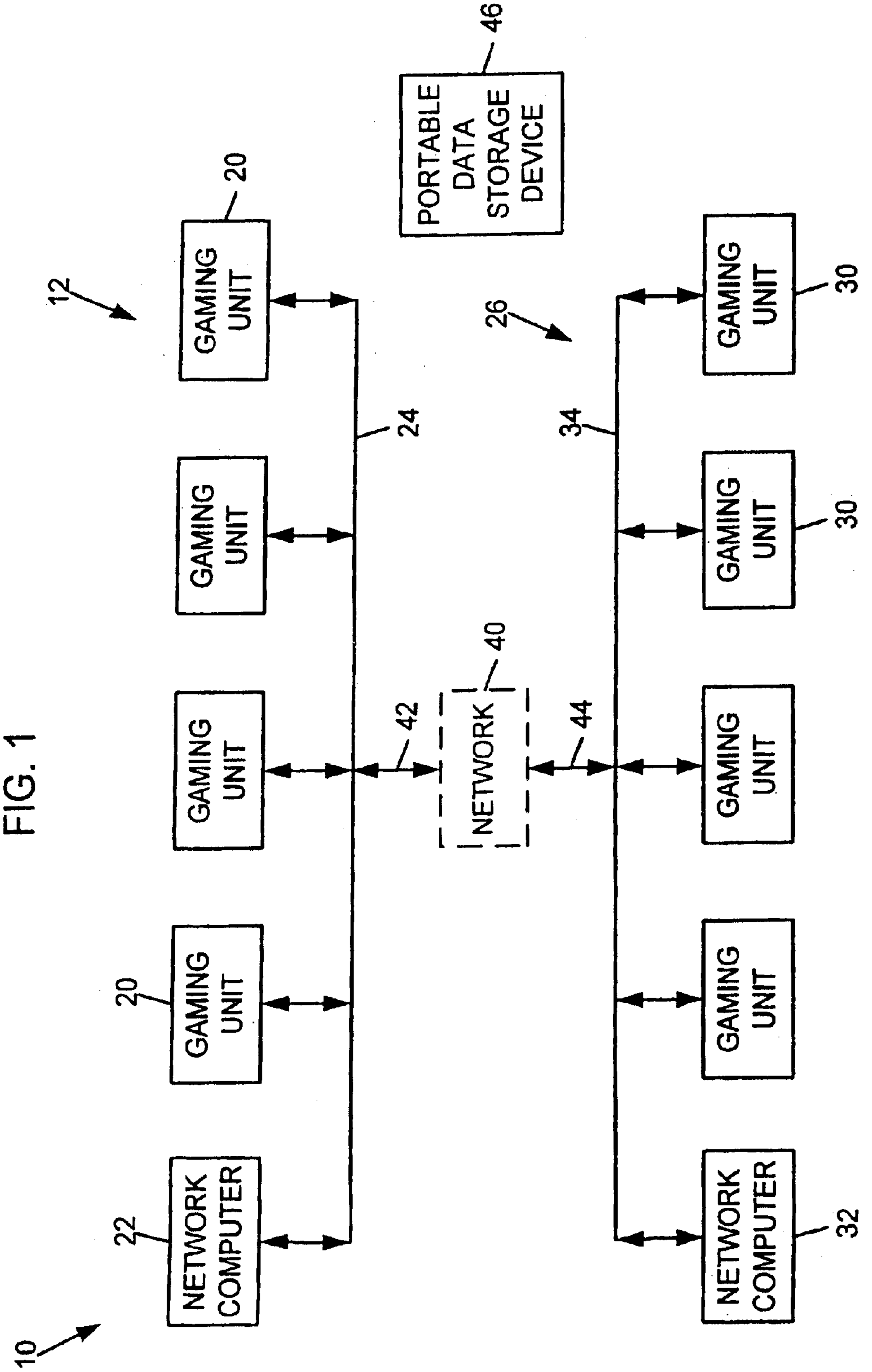
FIG. 1 is an exemplary schematic block diagram of a gaming system that may be used to carry out sequential gaming activities.

FIG. 1 is an exemplary schematic block diagram of a gaming system 10 that may be used to carry out the sequential gaming activities described herein. As shown in FIG. 1, the gaming system 10 may include a first group or network 12 of casino gaming units 20 operatively coupled to a server or network computer 22 via a network data link or bus 24. The gaming system 10 may also include a second group or network 26 of casino gaming units 30 operatively coupled to a server or network computer 32 via a network data link or bus 34. The first and second gaming networks 12 and 26 may be operatively coupled to each other via a network 40, which may comprise, for example, the Internet, a wide area network (WAN) or a local area network (LAN) via a first network link 42 and a second network link 44. The various networks shown in FIG. 1 may use any suitable communication media and protocol. For example, the networks 24, 34 and 40 may use any combination of hardwired (i.e., electrically conductive wire or cable, fiber optic, etc.) or wireless (e.g., cellular, satellite, etc.) transmission media. Additionally, the networks 24, 34 and 40 may use any desired communication protocol such as, for example, TCP/IP.

The first network 12 of gaming units 20 may be provided in a first venue or casino, and the second network 26 of gaming units 30 may be provided in a second venue or casino, which may be located in a separate geographic location from the first casino. For example, the two casinos may be located in different areas of the same city, or the casinos may be located in different states or countries. The network 40 may include a plurality of network computers or server computers (not shown), each of which may be operatively interconnected. Where the network 40 is Internet-based, data communications may take place over the communication links 42 and 44 using an Internet communication protocol such as, for example, TCP/IP. Of course, while two networks of gaming units are shown in FIG. 1, more or fewer networks of gaming units may be used within the gaming system 10, if desired.

The network computer 22 may be a server computer and may be used to accumulate and analyze data relating to the operation of the gaming units 20 and, if desired, the operation of any other gaming units or devices within the system 10. Generally speaking, the network computer 22 may continuously receive data from each of the gaming units 20 indicative of the dollar amount and number of wagers made on each of the gaming units 20, data indicative of how much each of the gaming units 20 pays out in winnings, data regarding the identity and gaming habits of players playing each of the gaming units 20, etc. The network computer 32 may be a server computer and may be used to perform the same or different functions in relation to the gaming units 30 (or any other gaming units within the system 10) as the network computer 22 described above.

Although each of the networks 12 and 26 is shown to include one of the respective network computers 22 and 32 and four of the respective gaming units 20 and 30, different numbers of computers and gaming units may be utilized instead. For example, the network 12 may include a plurality of network computers 22 and tens or hundreds of gaming units 20, all of which may be interconnected via the network data link or bus 24. Although the network data link 24 is shown as a single data link, the network data link 24 may include multiple data links.

As described in greater detail herein, players may interact with the gaming system 10 using a portable data storage device 46. The portable data storage device 46 may be implemented using, for example, a magnetic stripe card, a smart card, a smart PIN device, a special key PIN entry, a personal data assistant (PDA), a cellular phone, or any other device or system capable of storing information relating to a particular player. Information stored on the portable data storage device 46 may include a unique identifier that may be used by the system 10 to determine the identity of the person associated with the storage device 46. Further, the system 10 may use the unique identifier stored on the storage device 46 to track the activities of the player using the storage device 46. Still further, the portable data storage device 46 may store information pertaining to accumulated bonus points (e.g., the result of a player's activities at one or more gaming devices), rewards or other incentives, promotional items, a game identifier, a gaming machine identifier, last use statistics, etc.

Figure 2:
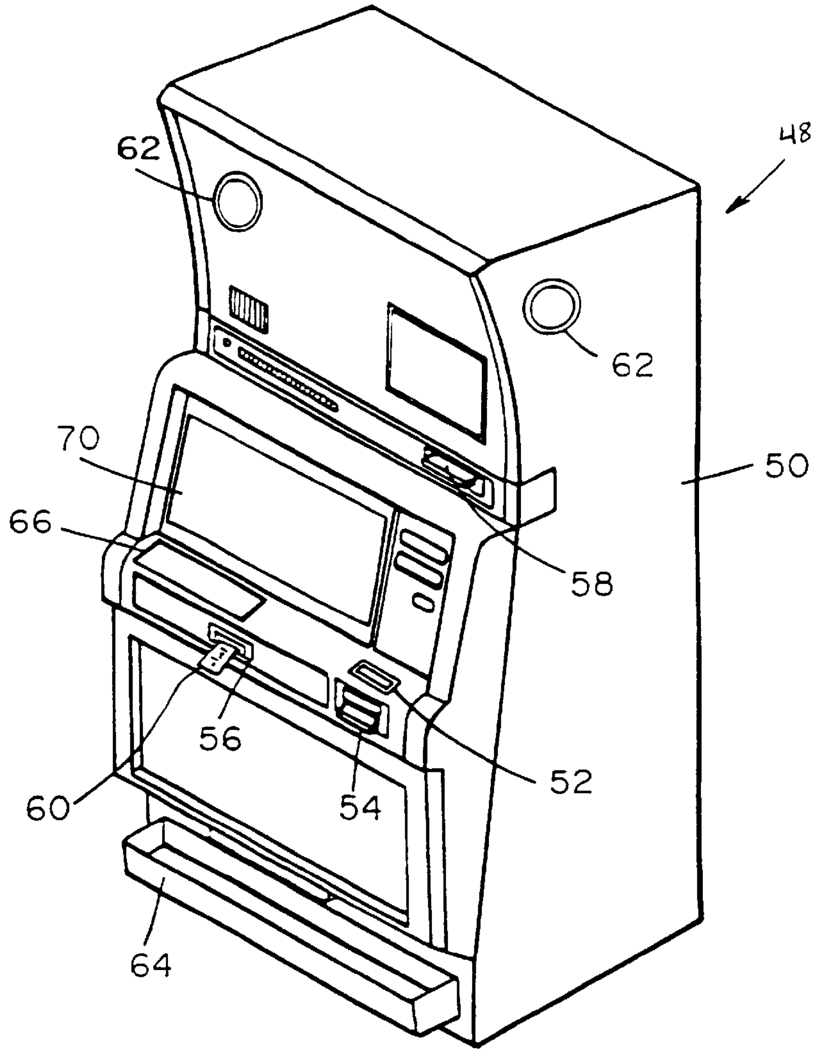
FIG. 2 is an exemplary perspective view of a gaming unit that may be used within the system shown in FIG. 1.

FIG. 2 is an exemplary perspective view of a gaming unit 48 that may be used within the gaming system 10 shown in FIG. 1. Although the following description addresses the design of the gaming unit 48, one or more of the gaming units 20 and 30 may have the same design as the gaming unit 48 described below. Additionally, the design of one or more of the gaming units 20 may be different than the design of other gaming units 20, and the design of one or more of the gaming units 30 may be different than the design of other gaming units 30. Thus, each gaming unit 20 may be any type of casino gaming unit and may have various different structures and methods of operation. For exemplary purposes, various designs of the gaming units 20 and 30 are described below in connection with the gaming unit 48 shown in FIG. 2. However, numerous other designs may be utilized instead.

Referring to FIG. 2, the casino gaming unit 48 may include a housing or cabinet 50 and one or more input devices, which may include a coin slot or acceptor 52, a paper currency acceptor 54, a ticket reader/printer 56 and a card reader 58, which may be used to input value to the gaming unit 48.

The gaming unit 48 may include the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card, a smart card, etc. If provided for player tracking purposes, the card reader 58 may be used to read data from, and/or to write data to, for example, the portable data storage device 46 (FIG. 1), which may include information or data representing the identity of a player, the identity of a casino, the player's gaming habits, the identity and/or location of a particular gaming device, etc. Of course, the gaming device 48 may alternatively or additionally include an interface specifically configured to interface with particular types of portable data storage devices such as, for example, a PDA, a smart PIN device, etc. In any event, the player may use either the card reader 58 or some other interface, if provided, to communicatively couple the portable data storage device 46 (FIG. 1) to the gaming device 48 which, in turn, enables one or more of the network computers 22 and 32 and/or the network 40 to exchange information with the portable data storage device 46. Thus, the casino gaming unit 48 may provide a way for a player to provide personal information relating to their identity, play history or statistics, etc. to the system 10 and a way for the player to send and receive a variety of information or data and/or value to and from the system 10 such as, for example, promotional incentives, cash or game play bonuses, loyalty incentives, etc.

Furthermore, the card reader 58 or other input device or interface may enable the player to transfer monetary value to and to receive monetary value from the gaming device 48 and system 10. The gaming device 48 may include any other value input device desired. Generally speaking, a value input device may include any device that can accept value from a customer. As used herein, the term "value" may encompass gaming tokens, coins, paper currency, ticket vouchers, credit or debit cards, and any other object representative of value.

The gaming unit 48 may include one or more audio speakers 62, a coin payout tray 64, an input control panel 66, and a color video display unit 70 for displaying images relating to the game or games provided by the gaming unit 48. The audio speakers 62 may generate audio representing sounds such as the noise of spinning slot machine reels, a dealer's voice, music, announcement or any other audio related to a casino game. The audio may include messages, promotional incentives and other types of messages that, if desired, have been personalized for a particular user. Additionally, the input control panel 66 may be provided with a plurality of pushbuttons or touch-sensitive areas that may be pressed by a player to select games, make wagers, make gaming decisions, etc.

Figure 2A:
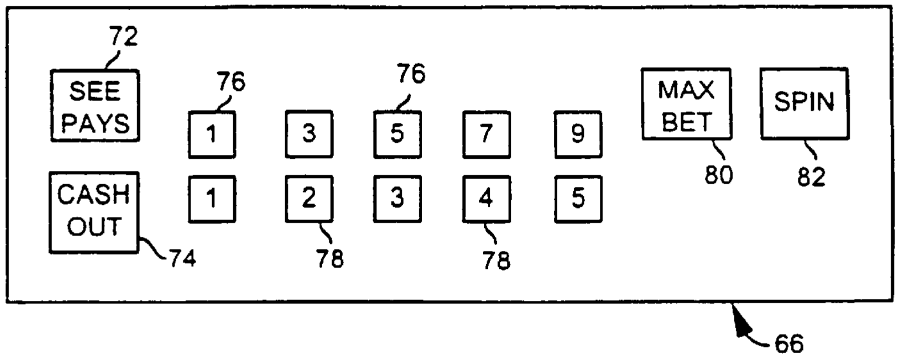
FIG. 2A is an exemplary diagrammatic view of a control panel for a gaming unit.

FIG. 2A is an exemplary diagrammatic view that depicts one possible configuration of the control panel 66, which may be used where the gaming unit 48 is a slot machine having a plurality of mechanical or "virtual" reels. As shown in FIG. 2A, the control panel 66 may include a "See Pays" button 72 that, when activated, causes the display unit 70 to generate one or more display screens showing the odds or payout information for the game or games provided by the gaming unit 48. As used herein, the term "button" encompasses any device or system that allows a player to make an input, such as an input device that must be depressed to make an input selection or a display area that a player may simply touch to effect an input selection. The control panel 66 may include a "Cash Out" button 74 that may be activated when a player decides to terminate play on the gaming unit 48, in which case the gaming unit 48 may return value to the player, such as by returning a number of coins to the player via the payout tray 64.

If the gaming unit 48 provides a slots game having a plurality of reels and a plurality of paylines that define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 48 provides a slots game having a plurality of reels, the control panel 66 may be provided with a plurality of selection buttons 78 each of which allows a player to specify a wager amount for each payline selected. For example, if the smallest wager accepted by the gaming unit 48 is a quarter ($0.25), the gaming unit 48 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 that enables a player to make the maximum wager allowable for a game. In the above example, where up to nine paylines were provided and up to five quarters could be wagered for each payline selected, the maximum allowable wager would be 45 quarters, or $11.25. The control panel 66 may include a spin button 82 to allow the player to initiate spinning of the reels of a slots game after a wager has been made.

In FIG. 2A, a rectangle shown around the buttons 72, 74, 76, 78, 80 and 82 designates an area in which the buttons 72, 74, 76, 78, 80 and 82 may be located. Consequently, the term "control panel" should not be construed to imply that a panel or plate separate from the housing 50 of the gaming unit 20 is required, and the term "control panel" may encompass a plurality or grouping of player-activated buttons.

Although one possible control panel 66 is described above, different buttons could be utilized instead in the control panel 66, and the particular buttons used may depend on the game or games that could be played on the gaming unit 48. Although the control panel 66 is shown as being separate from the display unit 70, the control panel 66 may be generated by the display unit 70. In that case, each of the buttons of the control panel 66 may be a colored area generated by the display unit 70 and some type of mechanism may be associated with the display unit 70 to detect when each of the buttons are touched, such as a touch-sensitive screen.

Gaming Unit Electronics

Figure 3:
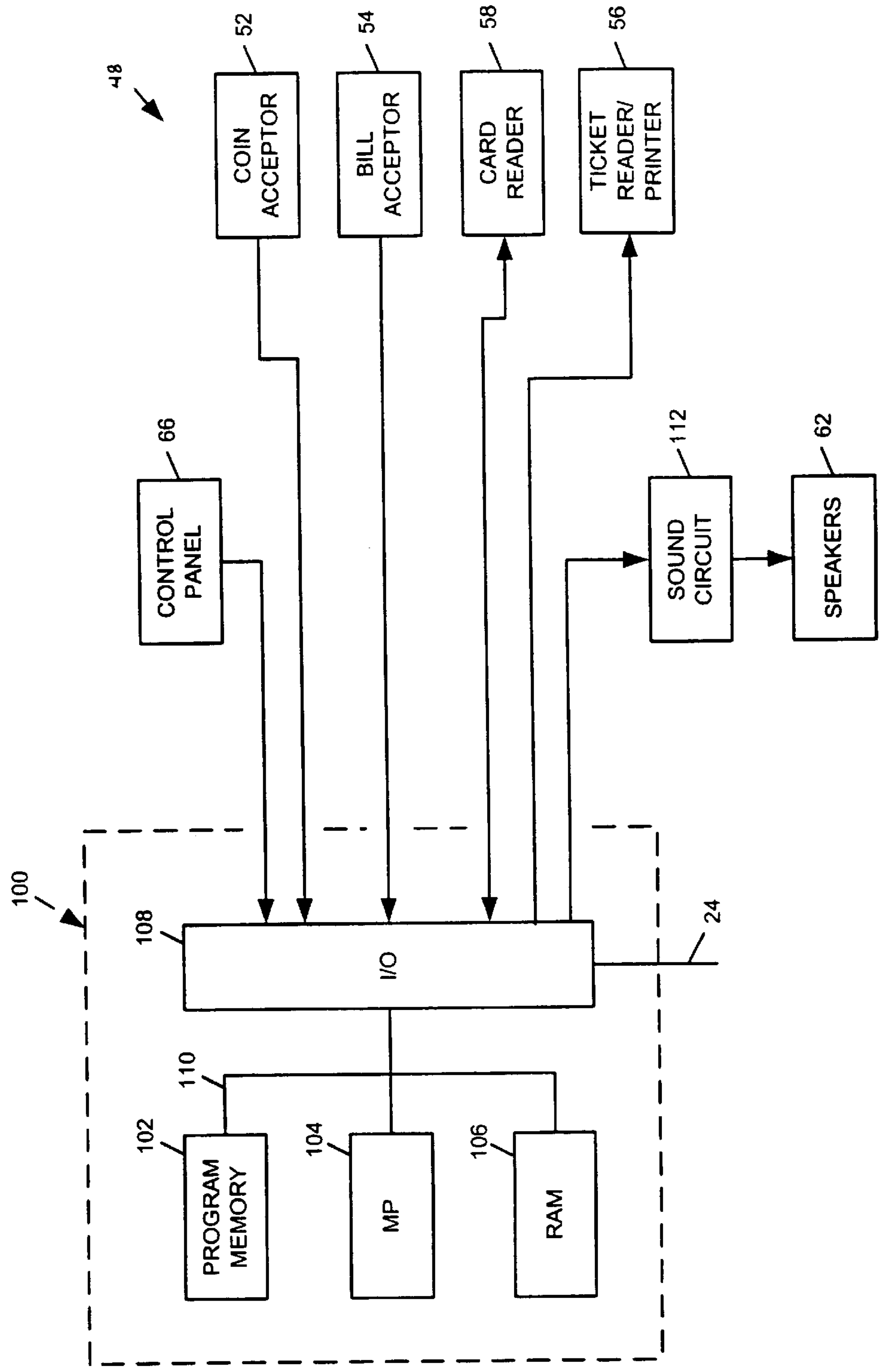
FIG. 3 is an exemplary schematic block diagram that depicts one manner in which the electronic components of the gaming unit of FIG. 2 may be configured.

FIG. 3 is an exemplary schematic block diagram that depicts one manner in which the electronic components of the gaming unit 48 of FIG. 2 may be configured. Referring to FIG. 3, the gaming unit 48 may include a controller 100 that may include a program memory 102, a microcontroller or microprocessor (MP) 104, a random-access memory (RAM) 106 and an input/output (I/O) circuit 108, all of which may be interconnected via an address/data bus 110. Although only one microprocessor 104 is shown, the controller 100 could include multiple microprocessors 104 if desired. Similarly, the memory of the controller 100 may include multiple RAMs 106 and multiple program memories 102. Although the I/O circuit 108 is shown as a single block, the I/O circuit 108 may include a number of different types of I/O circuits. The RAM(s) 104 and program memories 102 may be implemented as semiconductor memories, magnetically readable memories, and/or optically readable memories, for example.

FIG. 3 illustrates that the control panel 66, the coin acceptor 52, the bill acceptor 54, the card reader 58 and the ticket reader/printer 56 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, which may include a voice-synthesis and sound-synthesis circuit or a driver circuit. The sound-generating circuit 112 may be coupled to the I/O circuit 108.

As shown in FIG. 3, the components 52, 54, 56, 58, 66 and 112 may be connected to the I/O circuit 108 via a respective direct line or conductor. However, different connection schemes could be used instead. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Overall Operation of Gaming Unit

One manner in which one or more of the gaming units 20 (and one or more of the gaming units 30) may operate is described below in connection with a number of flowcharts that represent a number of portions of or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, and/or by an Internet interface that connects the gaming unit 20 with a remote computer (such as one of the network computers 22 and 32) having a memory in which the computer program portions are stored. The computer program portions may be written in any high level language such as C, C+, C++ or the like or any low-level, assembly or machine language. By storing the computer program portions therein, various portions of the memories 102 and 106 are physically and/or structurally configured in accordance with computer program instructions.

Figure 4:
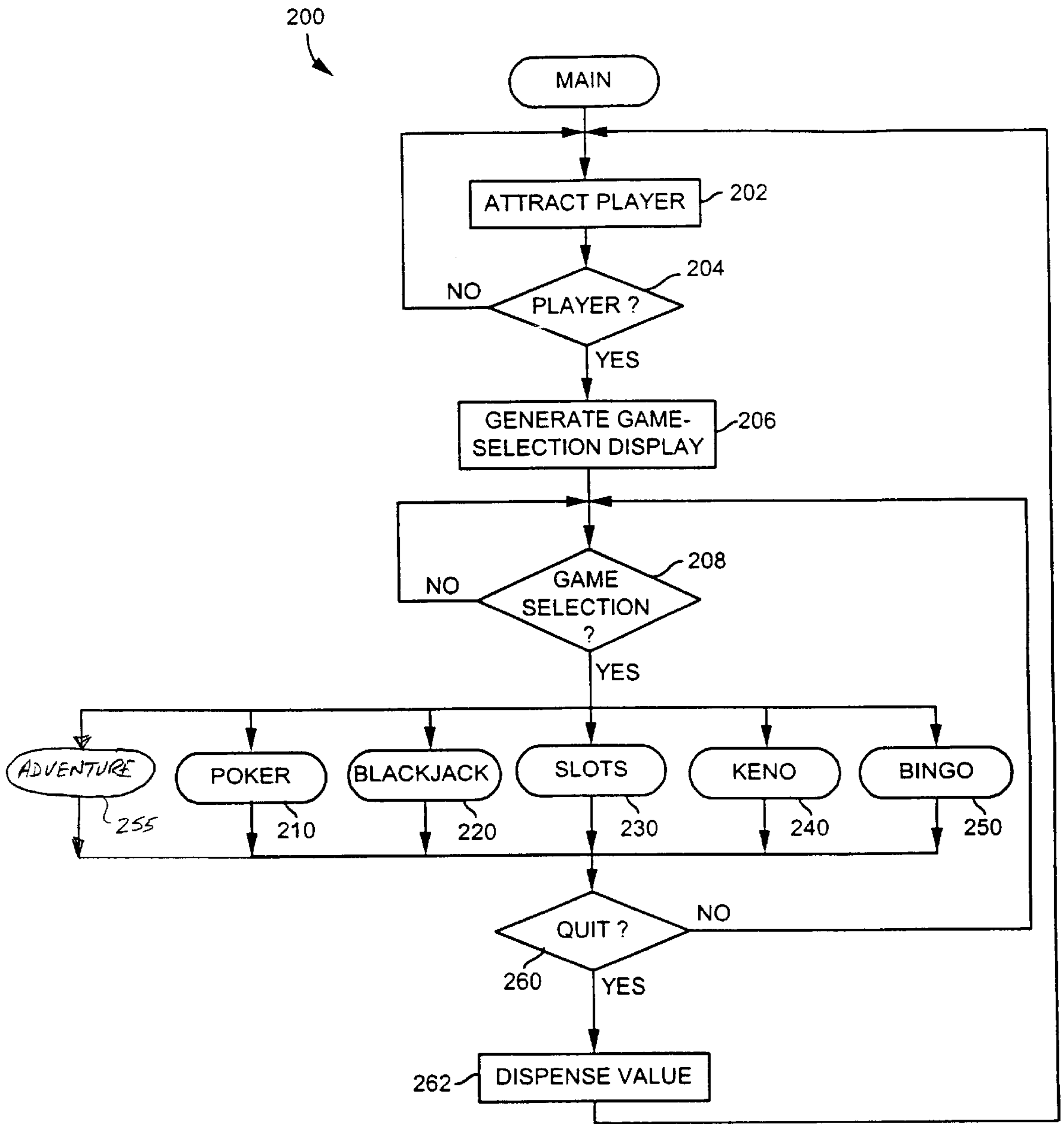
FIG. 4 is an exemplary flowchart of a main routine that may be performed during operation of one or more gaming units.

FIG. 4 is an exemplary flowchart of a main routine 200 that may be performed during operation of one or more gaming units and which may be stored in the memory of the controller 100. Referring to FIG. 4, the main routine 200 may begin operation at block 202, during which an attraction sequence may be performed in an attempt to induce a potential player in a casino to play the gaming unit executing the main routine 200, which may be, for example, one or more of the gaming units 20 and 30 shown in FIG. 1. If the gaming unit executing the main routine 200 is similar or identical to the gaming unit 48 described in connection with FIG. 2, the attraction sequence may be performed by displaying one or more video images on the display unit 70 and/or causing one or more sound segments, such as voice or music, to be generated via the speakers 62. The attraction sequence may include a scrolling list of games that may be played on the gaming unit and/or video images of various games being played, such as video poker, video blackjack, video slots, video keno, video bingo, etc.

During performance of the attraction sequence, if a potential player makes any input to the gaming unit as determined at block 204, the attraction sequence may be terminated and a game-selection display may be generated on the display unit 70 at block 206 to allow the player to select a game available on the gaming unit. The gaming unit may detect an input at block 204 in various ways. For example, the gaming unit could detect if the player presses any button on the gaming unit; the gaming unit could determine if the player deposited one or more coins into the gaming unit; the gaming unit could determine if the player deposited paper currency into the gaming unit; etc.

The game-selection display generated at block 206 may include, for example, a list of video games that may be played on the gaming unit and/or a visual message to prompt the player to deposit value into the gaming unit. While the game-selection display is generated, the gaming unit may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, a video bingo routine 250 and an adventure routine 255, which may be used to carry out sequential gaming activities as described in greater detail below. At block 208, if no game selection is made within a given period of time, the operation of the routine 200 may branch back to block 202.

After one of the routines 210, 220, 230, 240, 250 and 255 has been performed to allow the player to play one of the games, block 260 may be utilized to determine whether the player wishes to terminate play on the gaming unit or to select another game. If the player wishes to stop playing the gaming unit, which wish may be expressed, for example, by selecting a "Cash Out" button, the controller 100 may dispense value to the player at block 262 based on the outcome of the game(s) played by the player. The operation of the main routine 200 may then return to block 202. If the player did not wish to quit as determined at block 260, the routine 200 may return to block 208 where the game-selection display may again be generated to allow the player to select another game.

It should be noted that although six routines are shown in FIG. 4, a different number and/or different types of routines could be included to allow play of a different number of games.

Figure 5:
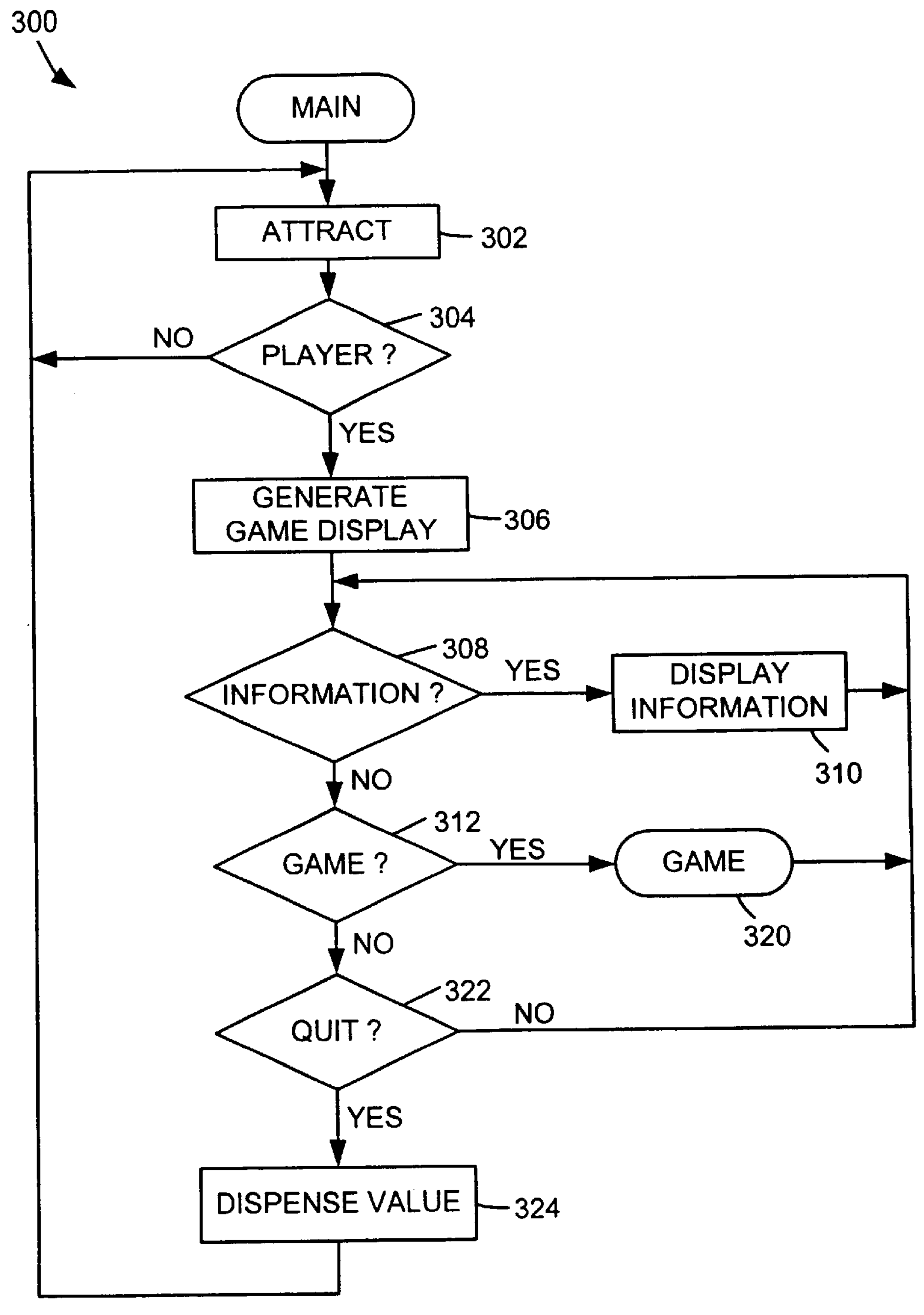
FIG. 5 is an exemplary flowchart of another main routine that may be performed during operation of one or more gaming units.

FIG. 5 is an exemplary flowchart of another main routine 300 that may be performed during operation of one or more gaming units and which may be stored in the memory of the controller 100. The main routine 300 may be utilized for gaming units that are designed to allow play of only a single game or single type of game. Referring to FIG. 5, the main routine 300 may begin operation at block 302, during which an attraction sequence may be performed in an attempt to induce a potential player in a casino to play the gaming unit executing the main routine 300. If the main routine is being executed by a gaming unit that is similar or identical to that shown in FIG. 2, the attraction sequence may be performed by displaying one or more video images on the display unit 70 and/or causing one or more sound segments, such as voice or music, to be generated via the speakers 62.

During performance of the attraction sequence, if a potential player makes any input to the gaming unit as determined at block 304, the attraction sequence may be terminated and a game display may be generated on the display unit 70 at block 306. The game display generated at block 306 may include, for example, an image of the casino game that may be played on the gaming unit and/or a visual message to prompt the player to deposit value into the gaming unit. At block 308, the gaming unit may determine if the player requested information concerning the game, in which case the requested information may be displayed at block 310. Block 312 may be used to determine if the player requested initiation of a game, in which case a game routine 320 may be performed. The game routine 320 could be any one of the game routines disclosed herein, such as one of the five game routines 210, 220, 230, 240, 250 or any other game routine.

After the routine 320 has been performed to allow the player to play the game, block 322 may be utilized to determine whether the player wishes to terminate play on the gaming unit. If the player wishes to stop playing the gaming unit, which wish may be expressed, for example, by selecting a "Cash Out" button, the controller 100 may dispense value to the player at block 324 based on the outcome of the game(s) played by the player. The operation of the routine 300 may then return to block 302. If the player did not wish to quit as determined at block 322, the operation of the routine 300 may return to block 308.

Video Poker

Figure 6:
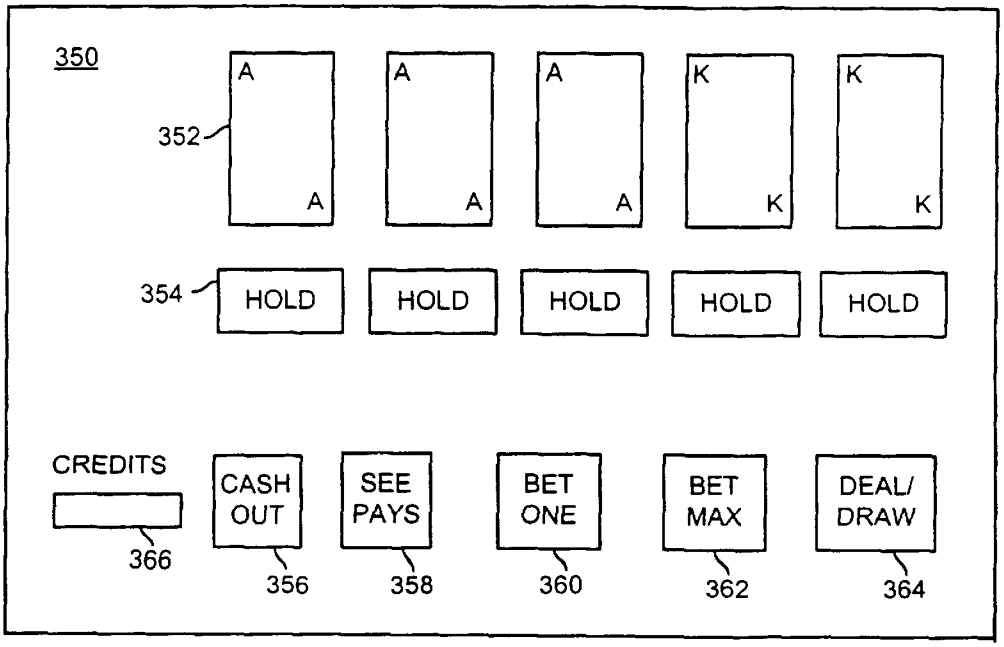
FIG. 6 depicts an exemplary video display that may be provided to a player during performance of the video poker routine of FIG. 8.
Figure 8:
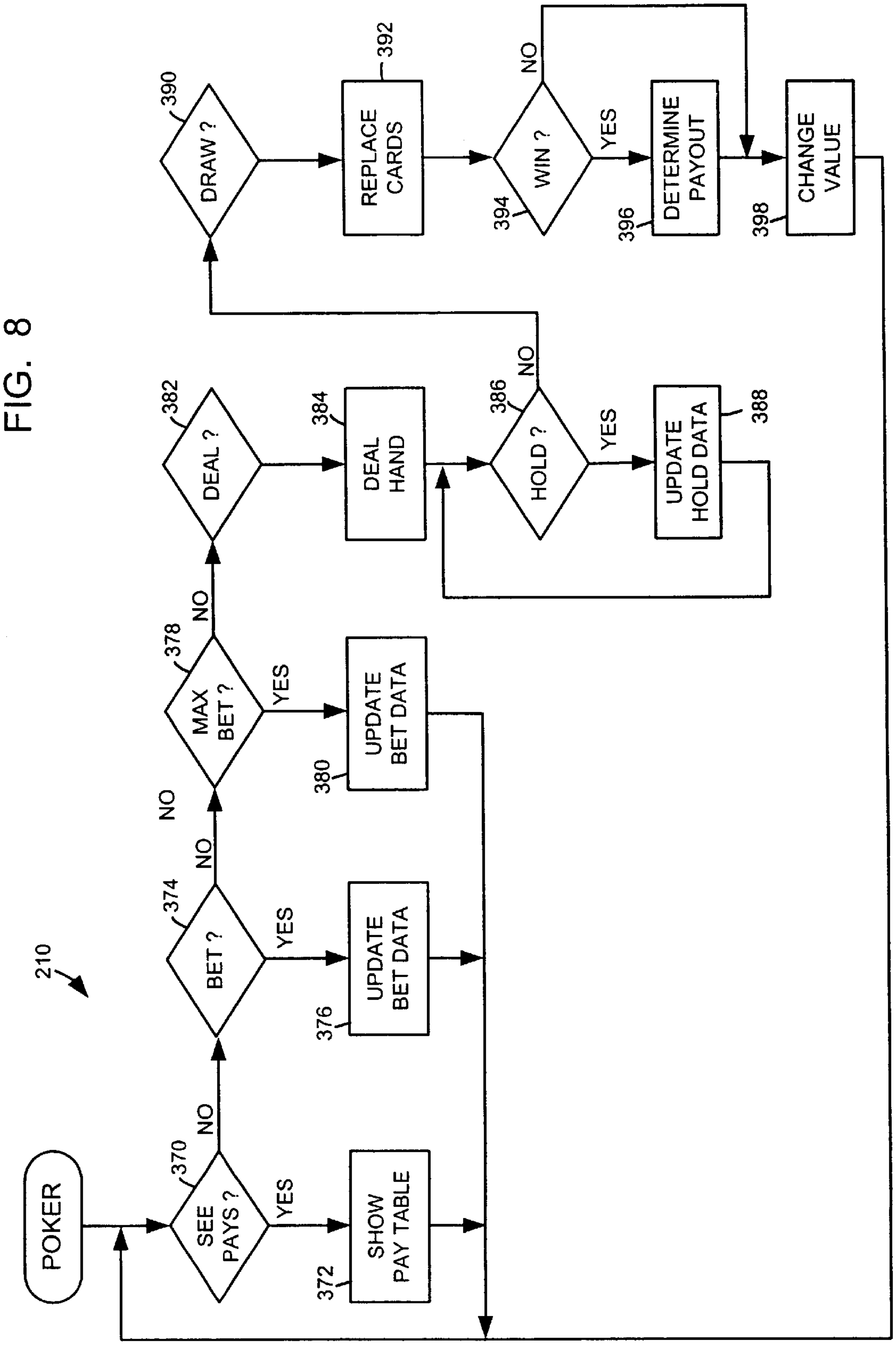
FIG. 8 is an exemplary flowchart of a video poker routine that may be performed by one or more gaming units.

FIG. 6 depicts an exemplary video display 350 that may be provided to a player during performance of the video poker routine 210 of FIG. 8. Referring to FIG. 6, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit of the gaming unit performing the video poker routine 210 is provided with a touch-sensitive screen, the buttons 354, 356, 358, 360, 362 and 364 may form part of the video display 350. Alternatively, one or more of those buttons may be provided as part of a control panel that is provided separately from the display unit of the gaming unit.

FIG. 8 is an exemplary flowchart of the video poker routine 210, which is shown in FIG. 4 and which may be performed by one or more gaming units. Referring to FIG. 8, at block 370, the routine 210 may determine whether the player has requested payout information, such as by activating the "See Pays" button 358, in which case at block 372 the routine 210 may cause one or more pay tables to be displayed on the display unit of the gaming unit performing the routine 210. At block 374, the routine 210 may determine whether the player has made a bet, such as by pressing the "Bet One Credit" button 360, in which case, at block 376, bet data corresponding to the bet made by the player may be stored in the memory of the controller 100. At block 378, the routine 210 may determine whether the player has pressed the "Bet Max Credits" button 362, in which case, at block 380, bet data corresponding to the maximum allowable bet may be stored in the memory of the controller 100.

At block 382, the routine 210 may determine if the player desires a new hand to be dealt, which may be determined by detecting if the "Deal/Draw" button 364 was activated after a wager was made. In that case, at block 384, a video poker hand may be "dealt" by causing the display unit of the gaming unit to generate the playing card images 352. After the hand is dealt, at block 386, the routine 210 may determine if any of the "Hold" buttons 354 have been activated by the player, in which case data regarding which of the playing card images 352 are to be "held" may be stored in the controller of the gaming unit at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine 210 may determine whether the poker hand represented by the playing card images 352 currently displayed is a winner. That determination may be made by comparing data representing the currently displayed poker hand with data representing all possible winning hands, which may be stored in the memory of the controller of the gaming unit. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 6).

Although the video poker routine 210 is described above in connection with a single poker hand of five cards, the routine 210 may be modified to allow other versions of poker to be played. For example, seven card poker may be played, or stud poker may be played. Alternatively or additionally, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 7:
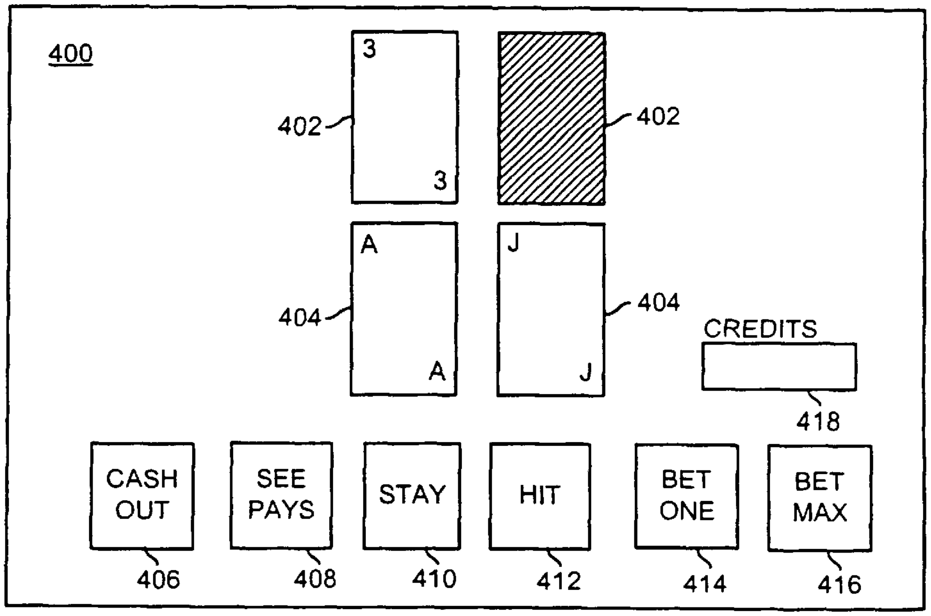
FIG. 7 depicts an exemplary video display that may be provided to a player during performance of the video blackjack routine of FIG. 9.

FIG. 7 depicts an exemplary video display 400 that may be provided to a player during performance of the video blackjack routine 220 shown schematically in FIG. 4. Referring to FIG. 7, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit performing the video blackjack routine 220.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit of the gaming unit performing the video blackjack routine 220 is provided with a touch-sensitive screen, the buttons 406, 408, 410, 412, 414 and 416 may form part of the video display 400. Alternatively, one or more of those buttons may be provided as part of a control panel that is provided separately from the display unit of the gaming unit.

Figure 9:
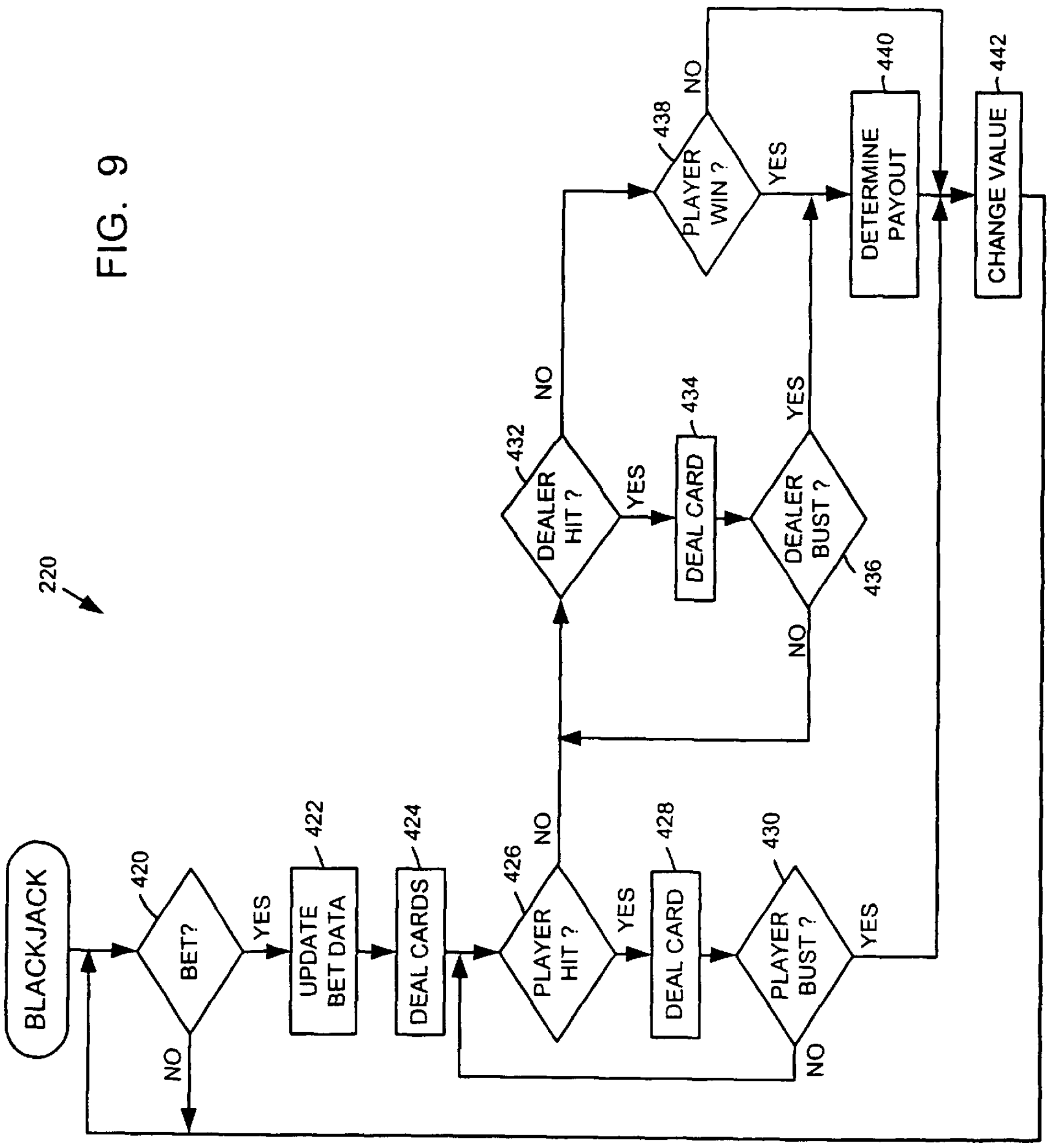
FIG. 9 is an exemplary flowchart of a video blackjack routine that may be performed by one or more gaming units.

FIG. 9 is an exemplary flowchart of the video blackjack routine 220 shown schematically in FIG. 4. Referring to FIG. 9, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller of the gaming unit performing the video blackjack routine 220. At block 424, a dealer's hand and a player's hand may be "dealt" by making the playing card images 402 and 404 appear on the display unit of the gaming unit.

At block 426, the player may be allowed to be "hit," in which case at block 428 another card will be dealt to the player's hand by making another playing card image 404 appear in the display 400. If the player is hit, block 430 may determine if the player has "bust," or exceeded twenty-one. If the player has not bust, blocks 426 and 428 may be performed again to allow the player to be hit again.

If the player decides not to hit, at block 432 the routine 220 may determine whether the dealer should be hit. Whether the dealer hits may be determined in accordance with predetermined rules, such as the dealer always hits if the dealer's hand totals fifteen or less. If the dealer hits, at block 434 the dealer's hand may be dealt another card by making another playing card image 402 appear in the display 400. At block 436, the routine 220 may determine whether the dealer has bust. If the dealer has not bust, blocks 432 and 434 may be performed again to allow the dealer to be hit again.

If the dealer does not hit, at block 436, the outcome of the blackjack game and a corresponding payout may be determined based on, for example, whether the player or the dealer has the higher hand that does not exceed twenty-one. If the player has a winning hand, a payout value corresponding to the winning hand may be determined at block 440. At block 442, the player's cumulative value or number of credits may be updated by subtracting the bet made by the player and adding, if the player won, the payout value determined at block 396. The cumulative value or number of credits may also be displayed in the display area 418 (FIG. 7).

Video Slots

FIG. 10 depicts an exemplary video display 450 that may be provided to a player during performance of the slots routine 230 shown schematically in FIG. 4. Referring to FIG. 10, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 12:
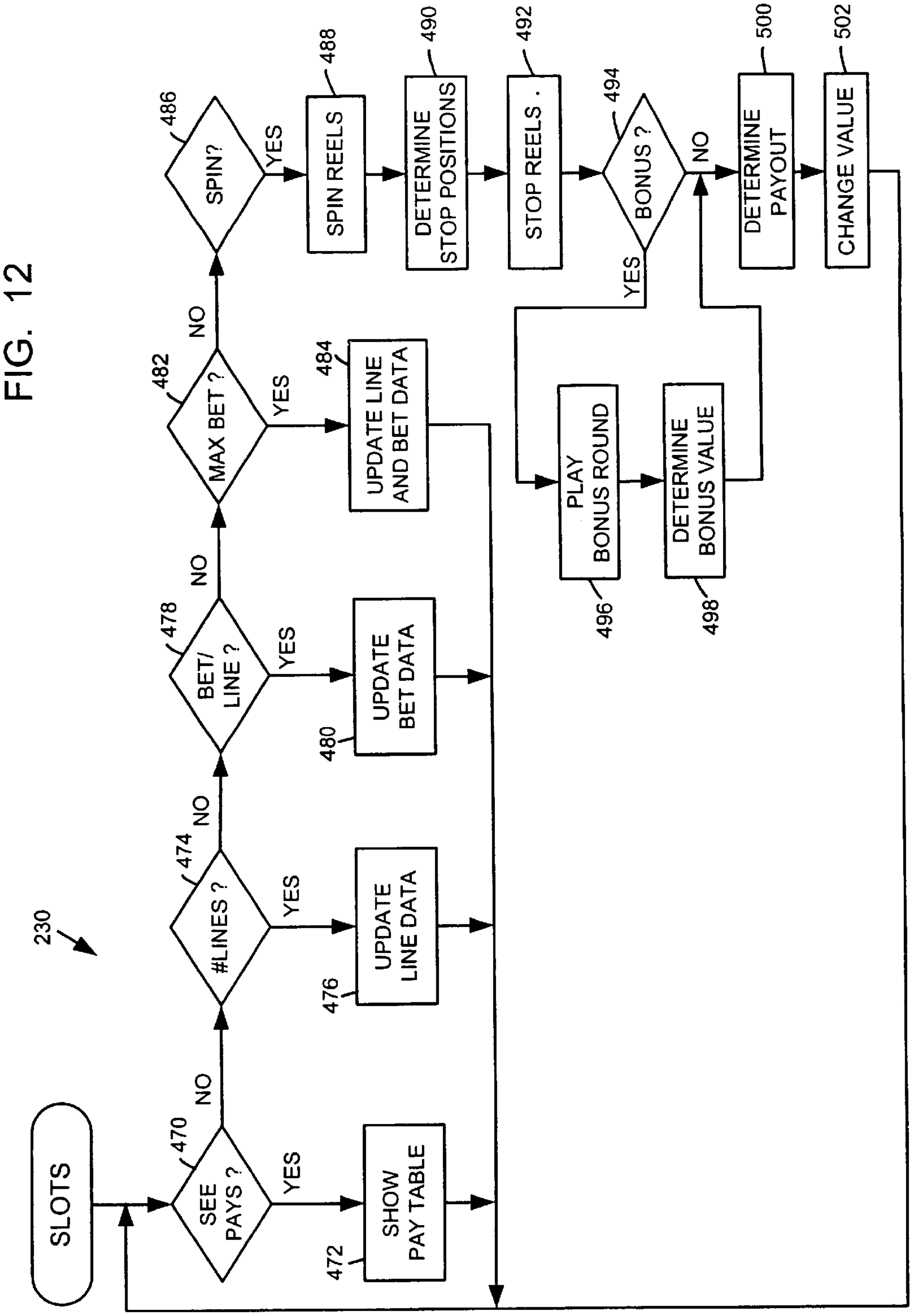
FIG. 12 is an exemplary flowchart of a slots routine that may be performed by one or more gaming units.

FIG. 12 is an exemplary flowchart of the slots routine 230 shown schematically in FIG. 4. Referring to FIG. 12, at block 470, the routine 230 may determine whether the player has requested payout information, such as by activating the "See Pays" button 458, in which case, at block 472, the routine 230 may cause one or more pay tables to be displayed on the display unit of the gaming unit performing the slots routine 230. At block 474, the routine 230 may determine whether the player has pressed one of the payline-selection buttons 460, in which case, at block 476, data corresponding to the number of paylines selected by the player may be stored in the memory of the controller of the gaming unit. At block 478, the routine 230 may determine whether the player has pressed one of the bet-selection buttons 462, in which case, at block 480, data corresponding to the amount bet per payline may be stored in the memory of the gaming unit controller. At block 482, the routine 230 may determine whether the player has pressed the "Max Bet" button 466, in which case, at block 484, bet data (which may include both payline data and bet-per-payline data) corresponding to the maximum allowable bet may be stored in the memory of the gaming unit controller.

If the "Spin" button 464 has been activated by the player as determined at block 486, at block 488, the routine 230 may cause the slot machine reel images 452 to begin "spinning" to simulate the appearance of a plurality of spinning mechanical slot machine reels. At block 490, the routine 230 may determine the positions at which the slot machine reel images will stop, or the particular symbol images 454 that will be displayed when the reel images 452 stop spinning. At block 492, the routine 230 may stop the reel images 452 from spinning by displaying stationary reel images 452 and images of three symbols 454 for each stopped reel image 452. The virtual reels may be stopped from left to right, from the perspective of the player, or in any other manner or sequence.

The routine 230 may provide for the possibility of a bonus game or round if certain conditions are met, such as the display in the stopped reel images 452 of a particular symbol 454. If there is such a bonus condition as determined at block 494, the routine 230 may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the video display unit of a gaming unit, actual slot machine reels that are capable of being spun may be utilized instead.

Video Keno

FIG. 11 depicts an exemplary video display 520 that may be provided to a player during performance of the video keno routine shown schematically in FIG. 4. Referring to FIG. 11, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit of the gaming unit performing the keno routine 230 is provided with a touch-sensitive screen, the buttons may form part of the video display 520. Alternatively, one or more of those buttons may be provided as part of a control panel that is provided separately from the display unit.

Figure 13:
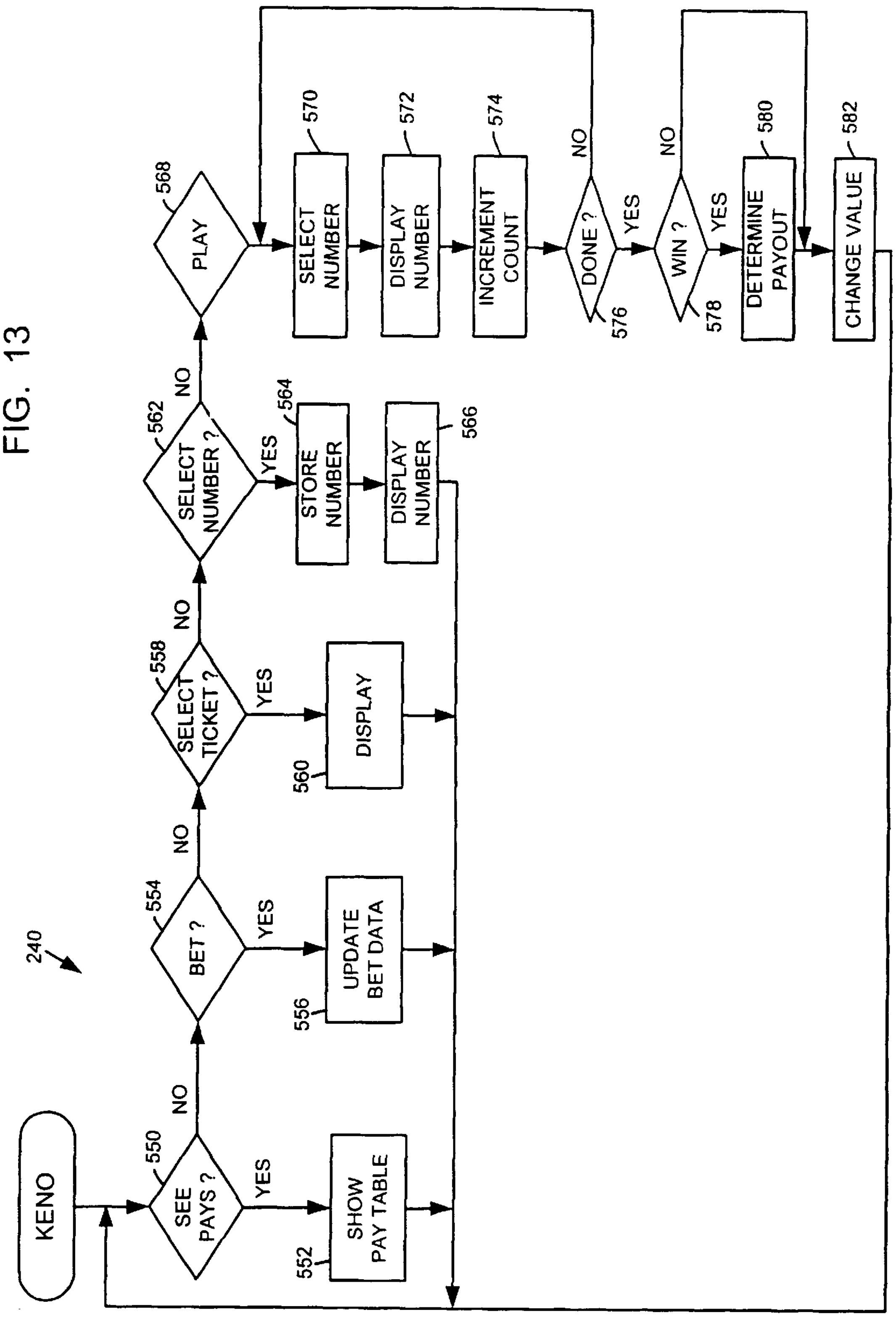
FIG. 13 is a flowchart of an embodiment of a video keno routine that may be performed by one or more gaming units.

FIG. 13 is an exemplary flowchart of the video keno routine 240 shown schematically in FIG. 4. The keno routine 240 may be utilized in connection with a single gaming unit where a single player is playing a keno game, or the keno routine 240 may be utilized in connection with multiple gaming units where multiple players are playing a single keno game. In the latter case, one or more of the acts described below may be performed either by the controller in each gaming unit or by one of the network computers 22 and 32, to which multiple gaming units are operatively connected.

Referring to FIG. 13, at block 550, the routine 240 may determine whether the player has requested payout information, such as by activating the "See Pays" button 528, in which case, at block 552, the routine 240 may cause one or more pay tables to be displayed on the display unit of the gaming unit performing the routine 240. At block 554, the routine 240 may determine whether the player has made a bet, such as by having pressed the "Bet One Credit" button 530 or the "Bet Max Credits" button 532, in which case, at block 556, bet data corresponding to the bet made by the player may be stored in the memory of the gaming unit controller. After the player has made a wager, at block 558, the player may select a keno ticket, and, at block 560, the ticket may be displayed on the display 520. At block 562, the player may select one or more game numbers, which may be within a range set by the casino. After being selected, the player's game numbers may be stored in the memory of the gaming unit controller at block 564 and may be included in the image 522 on the display 520 at block 566. After a certain amount of time, the keno game may be closed to additional players in the case where a number of players are playing a single keno game using multiple gaming units.

If play of the keno game is to begin as determined at block 568, at block 570, a game number within a range set by the casino may be randomly selected either by the gaming unit controller or a central computer operatively connected to the controller, such as one of the network computers 22 and 32. At block 572, the randomly selected game number may be displayed on the display unit of the gaming unit and the display units of other gaming units (if any) involved in the same keno game. At block 574, the gaming unit controller (or the central computer noted above) may increment a count that keeps track of how many game numbers have been selected at block 570.

At block 576, the gaming unit controller (or one of the network computers 22 and 32) may determine whether a maximum number of game numbers within the range have been randomly selected. If not, another game number may be randomly selected at block 570. If the maximum number of game numbers has been selected, at block 578, the gaming unit controller (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 11).

Video Bingo

Figure 14:
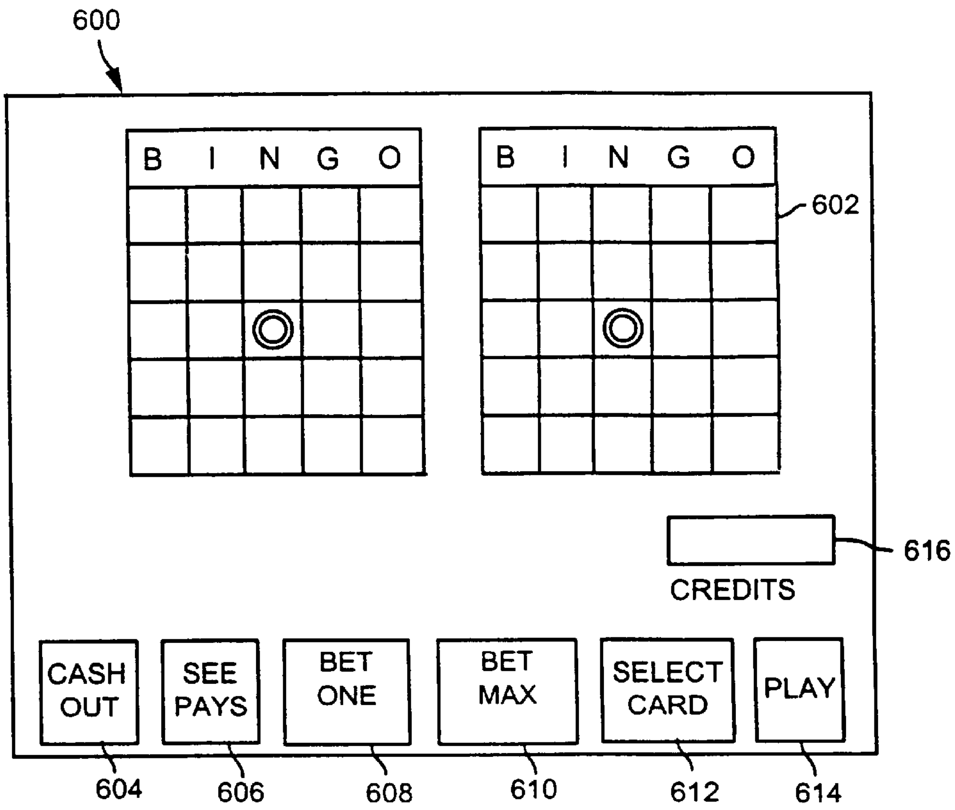
FIG. 14 depicts an exemplary video display that may be provided to a player during performance of the video bingo routine of FIG. 15.

FIG. 14 depicts an exemplary video display 600 that may be provided to a player during performance of the video bingo routine 250 shown schematically in FIG. 4. Referring to FIG. 14, the display 600 may include one or more video images 602 of a bingo card and images of the bingo numbers selected during the game. The bingo card images 602 may have a grid pattern, such as that shown in FIG. 14.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit of the gaming unit performing the bingo routine 250 is provided with a touch-sensitive screen, the buttons may form part of the video display 600. Alternatively, one or more of those buttons may be provided as part of a control panel that is provided separately from the display unit of the gaming unit.

Figure 15:
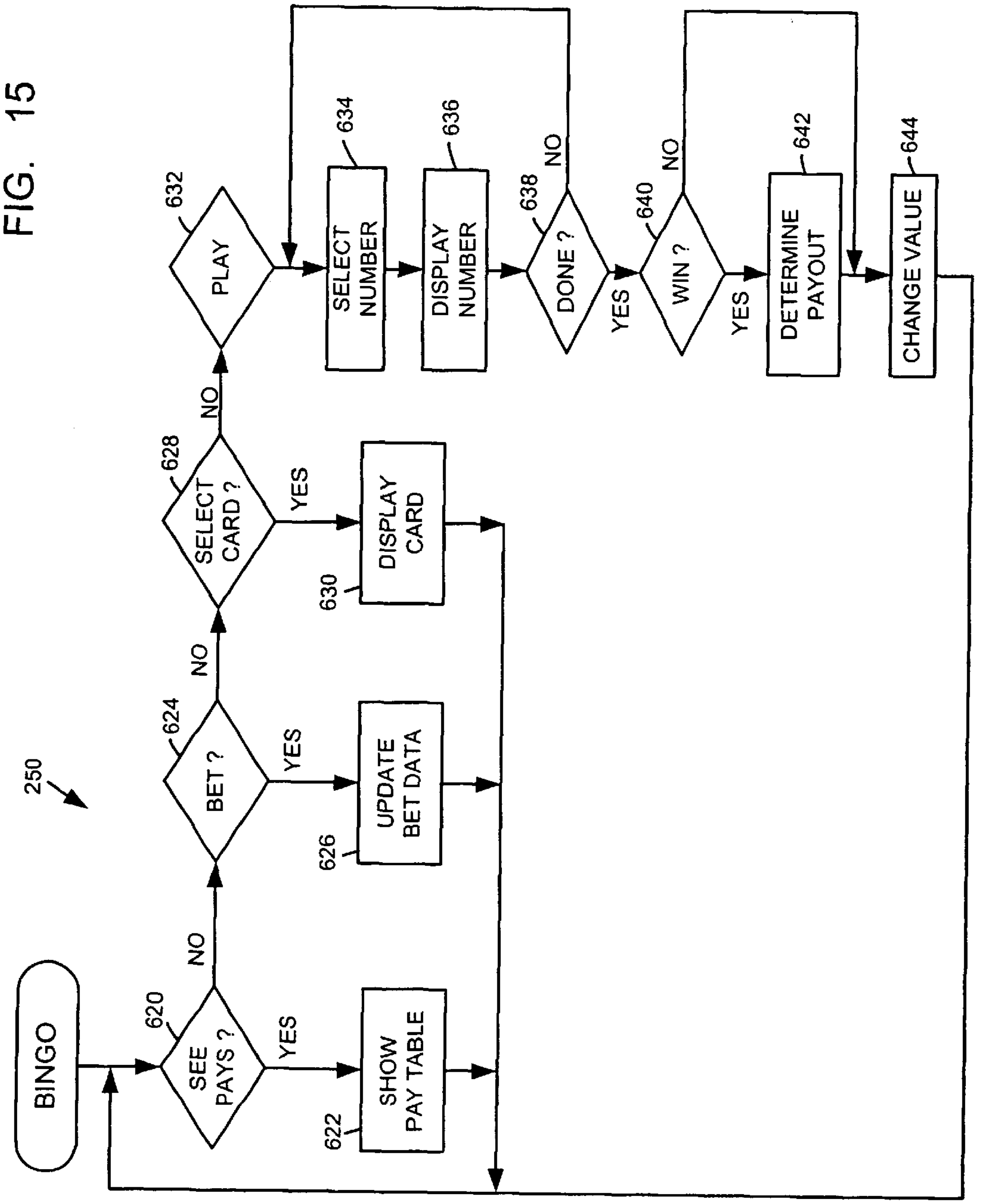
FIG. 15 is an exemplary flowchart of a video bingo routine that may be performed by one or more gaming units.

FIG. 15 is an exemplary flowchart of the video bingo routine 250 shown schematically in FIG. 4. The bingo routine 250 may be utilized in connection with a single gaming unit where a single player is playing a bingo game, or the bingo routine 250 may be utilized in connection with multiple gaming units where multiple players are playing a single bingo game. In the latter case, one or more of the acts described below may be performed either by the controller in each gaming unit or by one of the network computers 22 and 32 to which multiple gaming units are operatively connected.

Referring to FIG. 15, at block 620, the routine 250 may determine whether the player has requested payout information, such as by activating the "See Pays" button 606, in which case, at block 622, the routine 250 may cause one or more pay tables to be displayed on the display unit of the gaming unit(s) performing the routine 250. At block 624, the routine 250 may determine whether the player has made a bet, such as by having pressed the "Bet One Credit" button 608 or the "Bet Max Credits" button 610, in which case, at block 626, bet data corresponding to the bet made by the player may be stored in the memory of the gaming unit controller.

After the player has made a wager, at block 628, the player may select a bingo card, which may be generated randomly. The player may select more than one bingo card, and there may be a maximum number of bingo cards that a player may select. After play is to commence as determined at block 632, at block 634, a bingo number may be randomly generated by the gaming unit controller or a central computer such as one of the network computers 22 and 32. At block 636, the bingo number may be displayed on the display units of one or more of the gaming units involved in the bingo game.

At block 638, the gaming unit controller (or a central computer) may determine whether any player has won the bingo game. If no player has won, another bingo number may be randomly selected at block 634. If any player has bingo as determined at block 638, the routine may determine at block 640 whether the player playing that gaming unit was the winner. If so, at block 642, a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 14).

Sequential Gaming

In addition to the various gaming routines described above that may be executed by one or more of the gaming units 20 and 30 of the system 10 shown in FIG. 1, one or more of the network computers 22 and 32 may be used to carry out sequential gaming activities that encourage players to play particular games using a particular series or sequence of gaming units within the system 10. In this manner, the sequential gaming activities described herein add another level of gaming to the system 10 that overlays the localized gaming activities that may be carried out at each of the individual gaming units within the system 10. In other words, the sequential gaming activities described herein result in a multilevel sequential gaming environment that may be used by casino operators and other types of business operators to create interrelationships between gaming units within a particular venue, between gaming units associated with different venues that may be geographically dispersed, between casinos and other types of business establishments, etc. Such interrelationships may be used to encourage players to use (i.e., promote) relatively new types of gaming units, to encourage players to experience a variety of venues or casinos, to encourage players to use a variety of other types of services and/or products, which may be related to gambling or which may be related to any other type of business. Additionally, the sequential gaming activities described herein provide another level of excitement or adventure that may enhance the overall gaming experience for players, thereby increasing casino revenue by increasing the number or volume of players and the dollar volume of play in which each player engages.

Figure 16:
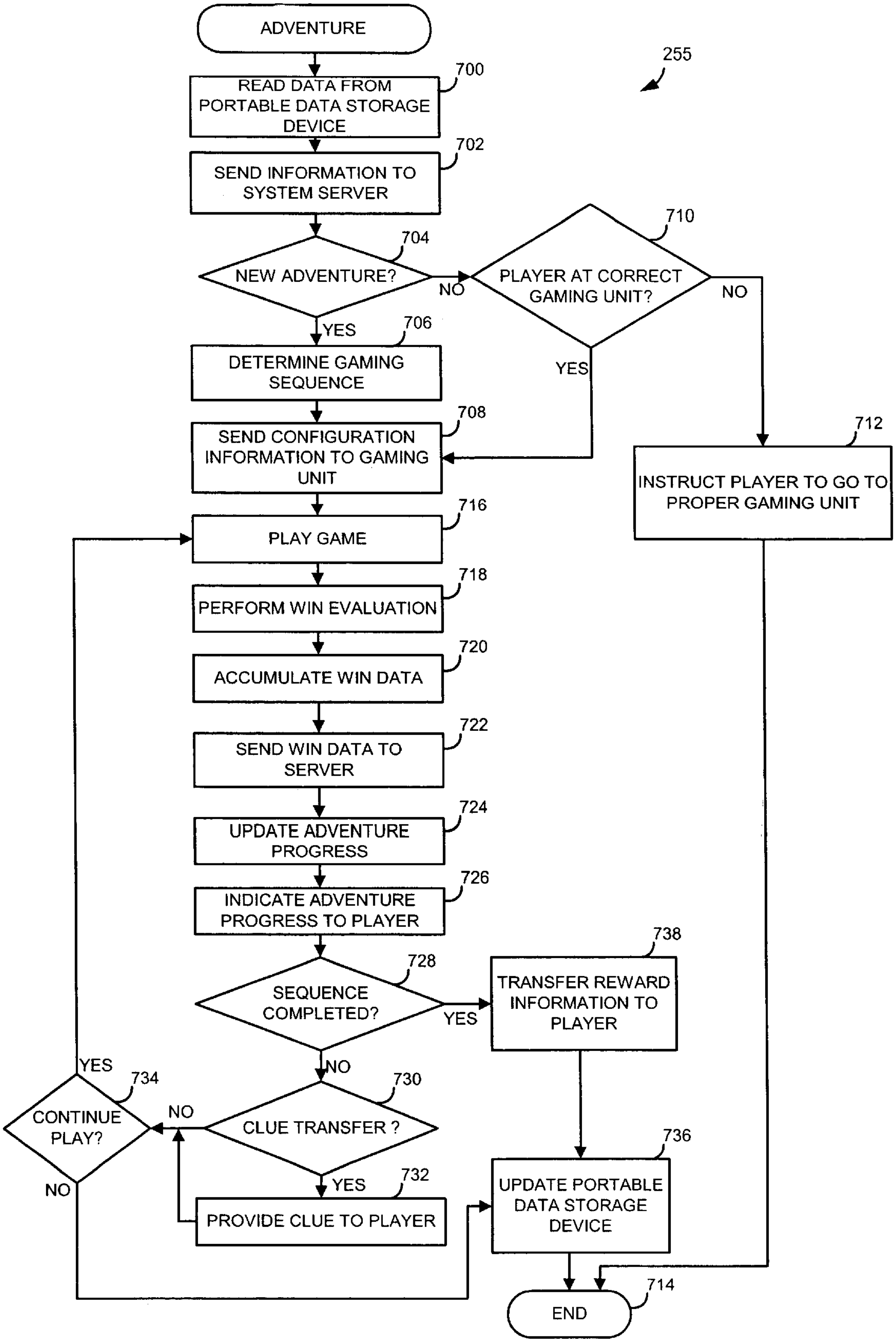
FIG. 16 is a flowchart depicting one manner in which the adventure routine shown schematically in FIG. 4 may be carried out.

FIG. 16 is an exemplary flowchart of the adventure routine 255 shown schematically in FIG. 4, which may be performed by one or more of the gaming units 20 and 30 within the system 10 to enable one or more players to engage in sequential gaming activities. Before discussing the adventure routine 255 in greater detail, it is important to recognize that the adventure routine 255 described herein is only one exemplary manner in which sequential gaming activities may be carried out within the system 10.

If a player has selected an adventure (i.e., the adventure routine 255) within, for example, the main routine 200 (FIG. 4), the player may be prompted to communicatively couple their portable data storage device 46 to the gaming unit. For example, in the case where the portable data storage device 46 is a magnetic stripe card, a smart card, an optically encoded card, or any other type of card for storing information pertaining to a particular player, the player may insert the card into the reader 58 to enable communications between the card and the gaming unit. Additionally, the adventure routine 255 may include multiple software routines or portions of a software routine, some of which may be executed or performed by one or both of the network computers or servers 22 and 32 and/or some of which may be executed or performed locally within the gaming units 20 and 30.

In any case, once the portable data storage device 46 is communicatively coupled to the gaming unit, block 700 of the adventure routine 255 reads data from the portable data storage device 46. The data read by the gaming unit may include a unique identifier or code associated with a particular player, demographic information, biometric information, play statistics associated with the performance of the particular player, monetary value or credits, bonuses such as points, extended play, monetary value, etc., promotional value such as, for example, meals, promotional products, services or samples, etc., the progress or status of an adventure or sequential gaming activity that the player has started or in which the player is currently engaged, gaming-based incentives or rewards such as, for example, extended or free play, increased and/or multiplied wins, etc. Some or all of the data stored on the portable data storage device 46 may be read by the gaming unit and may be stored temporarily in a memory such as the RAM(s) 106, or any other suitable memory within the gaming unit.

At block 702, the routine 255 may send some or all of the information read at block 700 to one or both of the network computers 22 and 32, each of which may function as a data server for the gaming system 10. In addition, at block 702, the routine 255 may send information pertaining to the gaming machine such as, for example, a gaming unit identifier or the like, to the system server which, as noted above, may be one or both of the network computers 22 and 32. At block 704, the routine 255 may determine whether the player is continuing an adventure or sequential gaming activity or whether the player does not have any active adventure and, thus, would like to initiate a new adventure or sequential gaming activity. This determination may be made by, for example, by examining the information that has been extracted from the portable data storage device 46 (and that has been sent to the system server by the gaming device currently being played) for adventure sequences that have not yet been completed.

If at block 704 the routine 255 determines that a new adventure is needed, block 706 determines or generates a new adventure by determining a sequence of gaming activities to be played. The sequence of gaming activities determined by block 706 may provide a sequential gaming activity or an adventure in which a player is directed to play a particular sequence of the gaming units 20 and 30 to a particular degree (e.g., a particular level of winnings, a particular amount of time, etc.) in order to advance through the sequence or sequential game. However, if desired, other gaming activities such as, for example, table games, or any other desired gaming or non-gaming activities may be included in the sequence. In some cases, it may be desirable for block 706 to provide a sequence of gaming activities based on information related to a particular player. In other words, block 706 may provide sequential gaming activities that are specifically adapted for particular players. For example, block 706 may provide a sequence of gaming activities that includes gaming activities that a particular player has not played often or at all, gaming activities that are likely to be consistent with that player's preferences, betting habits, losses, available credit, demographic characteristics, etc. Of course, all or some of the player related information may be stored on the portable data storage device 46 and provided to the system server via blocks 700 and 702. Alternatively or additionally, block 706 may provide a sequence of gaming activities selected from a group of one or more possible predetermined sequences developed by a casino operator or a group of casino operators. Such predetermined sequences may, for example, be used to encourage play of new gaming activities, promote particular venues (e.g., new venues), promote other products or services, encourage players to increase their volume of betting, create profitable interrelationships between various types of gaming activities, between different venues, etc.

At block 708, the routine 255 sends configuration information to the gaming unit or activity at which the player is located. This configuration information may include textual and/or audio messages relating to the adventure or sequence of gaming activities though which the player will have to advance. Additionally, information relating to the reward for successfully advancing through the sequence or adventure, which may, for example, be a monetary bonus, a play time bonus, a winnings multiplier bonus, promotional merchandise, free services, etc., may be provided. The configuration information sent to the gaming unit may include information that causes the gaming unit to automatically select a gaming activity for the player based on the sequence of gaming activities that are defined by the adventure. For example, if a player is currently at a gaming unit that is capable of performing gaming routines such as the video poker routine 210, the blackjack routine 220, the slots routine 230, the keno routine 240, the bingo routine 250, etc. in addition to the adventure routine 255 described herein, and the next gaming activity required by the adventure or sequence is video poker, the configuration information may be used to cause the gaming device to automatically select video poker for play. Still further, the configuration information sent to the gaming unit may include promotional messages, which may be textual and/or graphical, that may relate to the particular venue in which the player is currently located, to a venue which is included in the adventure or gaming sequence, to a particular gaming unit or game that will be played during the adventure, etc.

If the routine 255 determines at block 704 that an uncompleted existing adventure or sequential gaming activity is to be played, then the routine 255 determines at block 710 whether the player is currently at the correct gaming unit. This determination may be made at the system server by, for example, comparing a unique identifier such as a numeric gaming unit identifier to a gaming unit identifier sent by the routine 255 at block 702 to the system server. Thus, if the gaming unit identifier sent by the unit at which the player is currently located matches the identifier associated with the gaming unit which is to be played next in the adventure or sequence, then the routine 255 determines that the player is at the correct gaming unit and sends configuration information to that gaming unit at block 708. On the other hand, if the routine 255 determines at block 710 that the player is not at the correct gaming unit, then at block 712 the routine 255 instructs the player to go to the proper gaming unit. These instructions may be textual, graphical and/or audio messages that are sent by the system server to the gaming unit at which the player is currently located, and the gaming unit may, in turn, display or play (i.e., in the case of audio) these messages so that the user is informed of where the next gaming unit or activity in the adventure or sequence is located. In some cases, for example, the next gaming unit or activity may be located within the venue at which the player is currently located, may be located in another remote venue, etc. After the routine has instructed the player where the next gaming unit or activity is located at block 712, the routine 255 ends at block 714 and control of the gaming unit may be returned to, for example, the main routine 200 (FIG. 4).

After the routine 255 has sent configuration information to the gaming unit at block 708, the routine 255 enables the player to play the game at block 716. The play of the game at block 716 may be similar or identical to, for example, any of the electronic video-based gaming routines 210, 220, 230, 240 and 250 described above, or may be any other desired electronic video-based gaming activity. Alternatively or additionally, the game played at block 716 may be some other gaming activity such as, for example, a table game, or may be any other desired activity.

Following the play of the game at block 716, the routine 255 performs a win evaluation at block 718 and accumulates the win data for the current player's gaming session at block 720. The routine 255 may then send the accumulated win data to the system server (e.g., one of the network computers 22 and 32) at block 722. In turn, the routine 255 may cause the system server to update the adventure progress at block 726. The updating of the adventure progress may be carried out by determining, for example, the amount of bonus points achieved in total and/or toward completing the current step or gaming activity in the adventure or sequence. Of course, many other manners of measuring adventure progress could be used. For example, the number plays in which a player has engage on a particular gaming unit, the amount of winnings in total or on a particular gaming unit, etc. could be used to control or measure adventure progress.

At block 728, the routine 255 may determine whether or not the sequence associated with the adventure currently being played by the player is completed. That is, whether or not all of the gaming units or activities in the sequence have been played to a sufficient level (e.g., winnings, bonus points, time etc.) as required by the adventure. If the adventure has not been completed (i.e., one or more gaming units or activities have not yet been played and/or one or more gaming units or activities have not been played to a sufficient level of winnings, bonus points, etc.), the routine 255 determines whether or not a clue associated with the next step (e.g., gaming unit or activity) of the adventure should be transferred or provided to the player. If, at block 730, the routine determines that the player has played the current gaming unit or activity to a level that meets or exceeds the level required by the adventure sequence, the routine 255 may provide a clue to the player at block 732. Such clues may take the form of a textual, graphical and/or audio message that directly informs the player of the location of a particular gaming unit or activity that must be played next according to the adventure sequence. In some cases, the next gaming unit or activity may be located within the same venue at which the player is currently located. In other cases, the next gaming unit or activity may be located within a different venue that may, for example, be located remotely from the player's current location. Still further, one or more clues may, instead of providing direct information regarding the identity and location of the next gaming unit or activity in the adventure, provide information that only hints or suggests in an indirect manner at the location and identity of the next gaming unit or activity to be played in the adventure. For example, the clue may include a partial description of the venue at which the next gaming unit or activity is located, may include terms that are associated with the next venue, gaming unit or activity in the adventure sequence, etc. Of course, the specificity of the clues may be of any degree desired and, may, for example, vary within a particular adventure, based on the particular player, from step to step within a given adventure, etc. The routine 255 may, for example, carry out the transfer of clue information by causing the system server to send the clue information over one or more of the networks 24, 34 and 40 to the one of the gaming units or activities 20 and 30 at which the player is currently located. In that case, the gaming unit or activity proximate to the player may convey the clue via a video display, speaker, by a paper ticket or by some other media.

After a clue has been transferred at block 732, or if it is determined at block 730 that a clue should not be transferred, the routine 255 may ask the player at block 734 whether or not play should continue. If the player indicates a desire to continue play, the routine 255 initiates another round of game play at block 716. On the other hand, if the player indicates a desire to terminate play, despite the fact that adventure has not been completed, the routine 255 updates the player's portable data storage device 46 at block 736. The update information may include current status of the adventure or sequential gaming activity such as, for example, adventure steps completed, the degree to which an incomplete step has been achieved, total bonus points, play statistics, any intermediate promotional items awarded, the remaining credit or monetary value available to the player, etc.

If at block 728 the routine 255 determines that the sequence or adventure has been successfully completed, the routine 255 may transfer reward information to the player at block 738. Reward information may include monetary value, bonus points, promotional items or merchandise such as dinners, hotel rooms, etc., free services, extended game play, or any other desired form of value that may function as an incentive for a player to initiate and complete an adventure sequence or sequential gaming activity. Similar to the transfer of clue information, the routine 255 may transfer rewards or reward information by causing the system server to send data pertaining to the reward via one or more of the networks 24, 34 and 40 to the one of the gaming units 20 and 30 or any other activity at which the player is currently located. If, for example, the reward information is transferred to a gaming unit, the gaming unit may display or otherwise communicate the reward information to the player and, at block 736, the routine 255 may cause the gaming unit or some other device to store the reward information on the portable data storage device 46. After the routine 255 has updated the portable data storage device 46 as described above, the routine 255 terminates at block 714 and control of the gaming unit or activity may be returned to, for example, a routine such as the main routine 200 (FIG. 4).

Although not specifically shown in FIG. 16, various credit checks, use authorizations, etc. may be used as desired. Such credit checks and authorizations are generally well known in the art. However, it should be noted that such credit checks and use authorizations may be based on unique alphanumeric codes, biometric information, etc., all of which may, for example, be stored on the portable data storage device 46 for subsequent comparison to actual information input by a player.

While the adventure or sequential gaming described in connection with FIG. 16 uses a sequence that is generated prior to beginning execution or play of the adventure, the sequence may, if desired, be generated in other manners. For example, adventures or sequences could be generated on-the-fly in a random fashion, based on the player's performance or based on any other parameter desired.

Figure 17A:
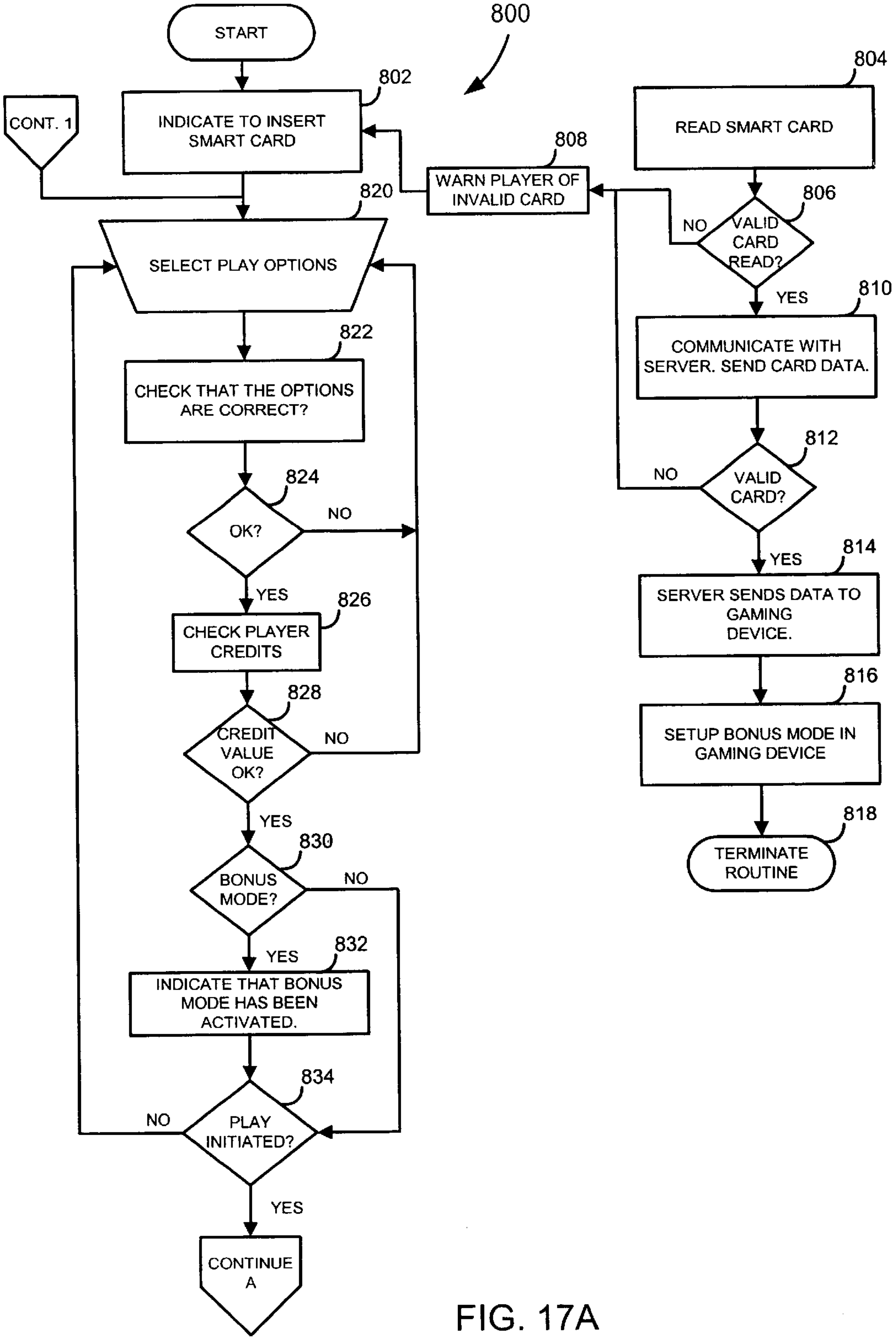
FIGS. 17A and 17B provide a flowchart that generally depicts an exemplary manner of carrying out sequential gaming activities.
Figure 17B:
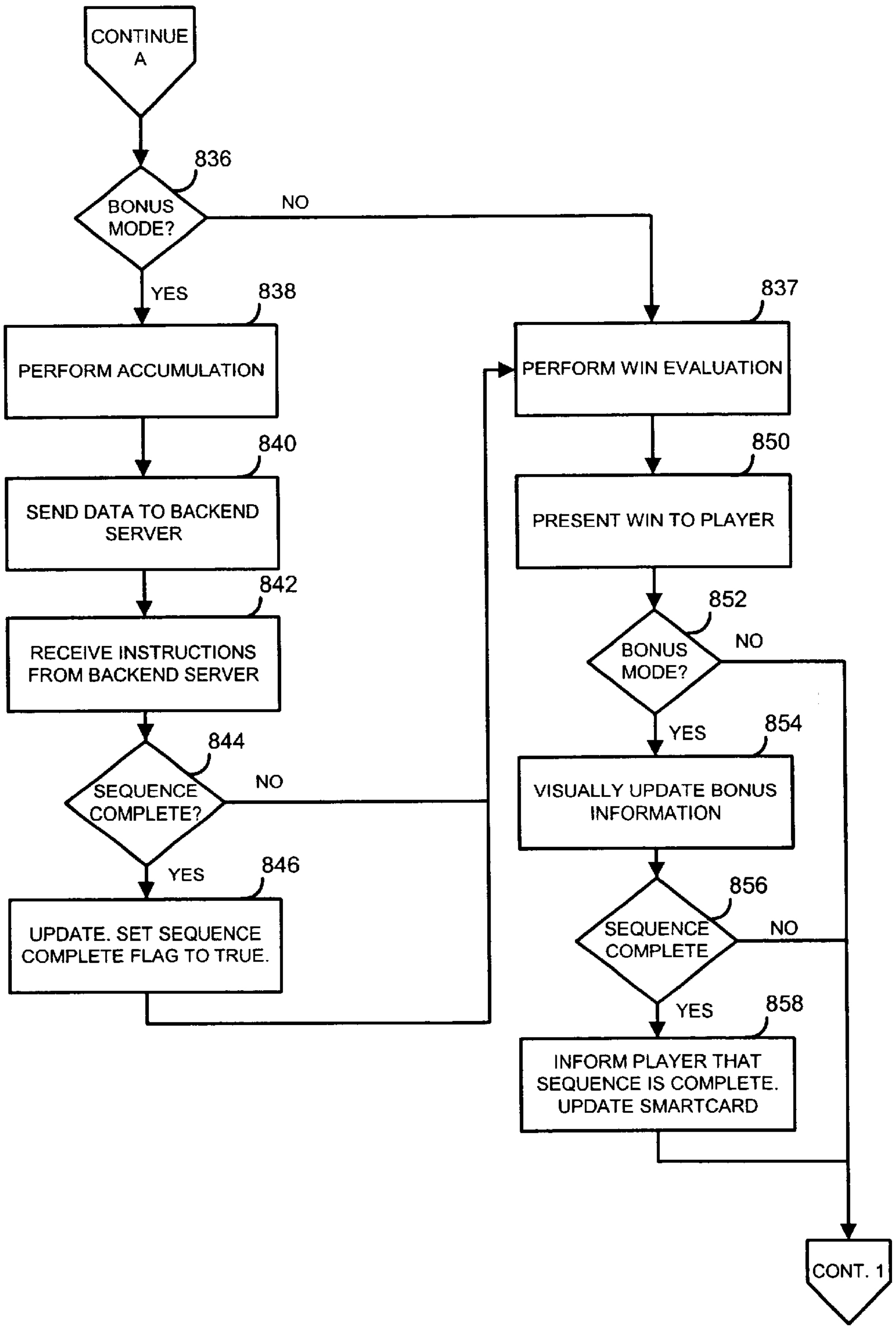

FIGS. 17A and 17B are an exemplary flowchart that generally depicts another sequential gaming routine 800 that may be used in connection with the gaming system shown in FIG. 1. While the routine 800 is depicted as being relatively generic, those skilled in the art will recognize that numerous particular gaming implementations may be easily generated therefrom by adapting the routine 800 to particular gaming environments and/or requirements.

At block 802, the routine 800 indicates that the player should insert a smart card into a card reader, which may be located on the gaming machine being used. Of course, if the portable data storage device 46 being used by the player is not a smart card but, rather, is some other type of portable data storage device, the routine 800 may simply be adapted to indicate that the player should appropriately interface the portable data storage device 46 to the gaming device being used.

At blocks 804 through 818, the routine 800 may carry out, in a parallel manner, if desired, smart card validity checks and setup of the gaming device being used by the player. In particular, at block 804, the routine 800 reads the smart card, or any other portable data storage device being used, to retrieve player information such as, for example, play history and statistics, credits available, player preferences, the player's progress within any sequential game or games being played, etc. At block 806, the routine 800 determines whether or not a valid card read occurred at block 804. If a valid card read did not occur, the routine 800 warns the player that the card may be invalid at block 808 and then indicates at block 802 that the player should reinsert a valid smart card. On the other hand, if a valid card read does occur at block 806, the routine 800 engages in communications with one or more of the network computers 22 and 32 that are functioning as system servers to send some or all of the information or data retrieved from the smart card to the server(s). At block 812, the routine 800 may cause the system server, based on the retrieved card data, to determine whether or not the smart card being used is valid. If the routine determines that the card is not valid, the routine may cause the routine to return to block 808 and warn the player that the smart card being used may be invalid. On the other hand, if the routine determines at block 812 that the smart card being used is valid, the routine 800 may cause the system server to send data or information to the gaming device being used. This information may, for example, include configuration and/or setup data, or any other desired data or information. At block 816, the routine 800 causes the gaming device being used to be configured or setup in a bonus mode. Such a bonus mode may enable the gaming device being used to enable the player to begin or to continue the play of a sequential game or the like such as, for example the adventure game described in connection with FIG. 16 above, or any other desired game. At block 818, the routine 800 causes the card validation and setup activities to terminate.

At block 820, the routine 800 may cause the gaming device being played to prompt the player to select play options and, at blocks 822 and 824, the routine 800 may check whether or not the play options selected by the player are correct. If the selected play options are not correct, the routine 800 returns control to block 820. On the other hand, if the selected play options are correct, the routine 800 checks player credits at blocks 826 and 828. If the player's current credit value is insufficient, the routine 800 returns control to block 820. However, if the player's current credit value is sufficient, the routine 800 determines at block 830 whether or not bonus mode operation has been activated within the gaming device being played. If bonus mode operation has been activated, the routine 800 indicates to the player that bonus mode has been activated at block 832. If bonus mode operation has not been activated or if bonus mode operation has been activated and indicated as such to the player, the routine 800 determines at block 834 whether or not play has been initiated. If play has not been initiated, the routine 800 returns control to block 820. On the other hand, if play has been initiated, the routine 800 determines at block 836 whether or not bonus mode has been activated.

If the routine 800 determines at block 836 that bonus mode has not been activated, the routine 800 performs a win evaluation at block 837. However, if the routine 800 determines at block 836 that bonus mode has been activated, then the routine 800 accumulates play data at block 838. Such an accumulation of play data may, for example, include an accumulation of bonus points, credits or any other desired type of data. At block 840, any accumulated data may be sent to the system server. At block 842, the routine 800 may cause the system server to send instructions to the gaming device being played. Such instructions may include, for example, clues that inform the player which gaming device or activity the player should play next, or any other appropriate instruction that facilitates play of the sequential game, adventure, etc. At block 844, the routine 800 may cause the system server to determine whether or not the gaming sequence is complete. In other words, the routine 800 may determine whether or not all of the required activities or events associated with the sequential gaming activity have been completed based on, for example, the data sent to the system server at block 840. If the sequence has not been completed, then the routine may perform a win evaluation at block 837, otherwise, if the sequence has been completed, the routine 800 may set a sequence complete flag to a "true" condition or, additionally or alternatively, the routine 800 may indicate that the sequence has been completed in any other desired manner.

After the win evaluation has been completed at block 837, the routine 800 may present the win to the player at block 850 using textual, graphical and/or audio messages, or in any other desired manner. At block 852, the routine 800 again determines whether or not bonus mode operation has been activated and, if not, the routine 800 returns control to block 820. If, however, bonus mode operation has been activated, the routine 800 causes the gaming device or activity being played by the player to update any displayed bonus information at block 854. At block 856, the routine 800 determines whether or not the sequence of gaming activities has been completed as required. If the gaming sequence has not been completed as required, then the routine 800 returns control to block 820. On the other hand, if the gaming sequence has been completed, then the routine 800 causes the gaming device or activity being played by the player to inform the player that the sequence has been completed at block 858. Additionally, the routine 800 may update the information stored on the smart card or other portable data storage device at block 858 to reflect the fact that the sequence has been successfully completed. Of course, any rewards such as, for example, promotional items, money, etc. may also be stored on the smart card for later redemption by the player as desired.

Although specific examples of the types of rewards or bonuses that players may receive in connection with playing the sequential gaming activities are described herein, many other types of rewards and/or incentives may be employed. By way of example only, a player may receive a special double-up sequence in which all or part of the bonuses received to date may be bet or risked for the opportunity to receive a further increase in the bonus. Also, for example, players obtaining or reaching a certain number of total bonus points within a certain period of time may receive a special smart card (e.g., a "gold" smart cart) that entitles that player to privileges and services that ordinary or new players may not be entitled to. Further, players obtaining a determined number of bonus points within a certain time period may be given preferred or exclusive access to internet sites at which bonuses may be retrieved or otherwise redeemed. Still further, players may use any accumulated bonuses to initiate a new game with special and/or additional bonuses that are based on the accumulated bonus points. For example, a player may be given the option to return to a favorite gaming unit or activity and may be allowed to play the gaming unit or activity under special or preferred terms that are a function of the level of bonus points accumulated while a completing a sequential game or adventure. Still further, players may be given the option during play of a sequential game to enter various current link progressives, which are a well known method of pooling jackpot prizes between a number of gaming units currently being played. Still further, a venue or other business entity may cause the system server to send messages to all players currently engaged in a sequential gaming activity or adventure that offers a promotion or incentive to all of these players simultaneously. For example, a casino may offer a new car to the first player to achieve a specific level of bonus points during a sequential gaming activity.

Of course, redemption of bonuses may be accomplished using any desired technique. For example, players may be given the option to store any earned reward or bonus for redemption at a later date. On the other hand, players may be given the option to redeem the bonus immediately as a cash or credit payout, and/or players may be given the option to take their smart card (or other type of portable data storage device) to a special kiosk where prizes, further games, etc. may be played based on the bonus points accumulated by that particular player. Still further, a gaming sequence may be established so that a player receives redemption tickets at each of the gaming activities in the determined sequence and the players may redeem such tickets for prizes at a designated location within one or more of venues participating in the sequential game, or at any other desired business establishment.

Numerous modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A gaming system, comprising:

a plurality of gaming units each of which is programmed to facilitate play of a different one of a plurality of games, each of the gaming units comprising:

a display unit;

a value input device; and a controller operatively coupled to the display unit and the value input device, the controller comprising a processor and a memory operatively coupled to the processor, the controller being programmed to cause a game display to be generated by the display unit; and a computer operatively coupled to each of the gaming units, the computer comprising a controller comprising a processor and a memory, the controller of the computer being programmed to determine a gaming sequence during which the player plays at a plurality of different gaming units, the player being physically present at each of the plurality of different gaming units in the gaming sequence where the player plays at each of the plurality of different gaming units in the gaming sequence; and the controller of the computer being programmed to cause data representing the gaming sequence to be transmitted to one of the plurality of gaming units.

2. The gaming system of claim 1, wherein the controller of the computer is programmed to cause the gaming sequence to be determined prior to play by the player of any of the gaming units that is to be played during the gaming sequence.

3. The gaming system of claim 1, wherein the controller of the computer is programmed to determine the gaming sequence based on identification information of the player who is to play at the plurality of different gaming units during the gaming sequence.

4. The gaming system of claim 1, wherein the controller of the computer is programmed to determine the gaming sequence based on identification information of the player who is to play at the plurality of different gaming units during the gaming sequence, the identification information being received from a portable data storage device.

5. The gaming system of claim 1, wherein each of the plurality of the gaming units is programmed to play a plurality of games.

6. The gaming system of claim 1, wherein each of the plurality of the gaming units is programmed to facilitate play of a slots game in which a plurality of reel images are displayed.

7. The gaming system of claim 1, wherein each of the plurality of the gaming units is programmed to facilitate play of one of the following games: video poker, video blackjack, slots, video bingo and video keno.

8. A method of operating a gaming system comprising a plurality of gaming units and a computer operatively coupled to each of the gaming units, the method comprising:

receiving player identification data that identifies a player, the player identification data being received by the computer from one of the gaming units;

determining, prior to commencement of game play, a gaming sequence during which the player plays at a plurality of different gaming units, the gaming sequence being determined based on the player identification data;

requiring the player to be physically present at each of the plurality of different gaming units in the gaming sequence so that the player plays at each of the plurality of different gaming units in the gaming sequence;

transmitting data representing the gaming sequence from the computer to one of the plurality of gaming units which the player is to play during the gaming sequence; and after commencement of game play, receiving from one of the gaming units game data relating to a game that was played on the one gaming unit by the player during the gaming sequence, the game data being received by the computer.

9. The method of claim 8, additionally comprising reading the player identification data from a portable data storage device that is proximate to one of the gaming units.

10. The method of claim 8, additionally comprising generating on one of the gaming units a game display comprising a plurality of reel symbols to facilitate play of a slots game.

11. The method of claim 8, additionally comprising generating on one of the gaming units a game display representing one of the following games: video poker, video blackjack, slots, video bingo and video keno.

12. A gaming system, comprising:

a communication network;

a portable data storage device having information associated with a player stored therein;

a plurality of gaming units communicatively coupled to the communication network, wherein each of the gaming units includes an interface for reading and for storing information within the portable data storage device; and a network computer communicatively coupled to the communication network and the plurality of gaming units, wherein the network computer is programmed to determine a gaming sequence during which the player plays at a plurality of different gaming units, the player being physically present at each of the plurality of different gaming units in the gaming sequence where the player plays at each of the plurality of different gaming units in the particular gaming sequence, based on the information associated with the player stored within the portable data storage device.

13. The gaming system of claim 12, wherein the communication network includes an internet communication link.

14. The gaming system of claim 12, wherein the portable data storage device is one of a smart card, a magnetic stripe card, a smart PIN, a personal data assistant and a cellular phone, and wherein the information associated with the player stored therein includes a unique identifier.

15. The gaming system of claim 12, wherein the interface for reading and for storing information within the portable data storage device includes one of a magnetic and an optical card reader.

16. The gaming system of claim 12, wherein the plurality of gaming units is associated with a plurality of business venues and a plurality of geographic locations.

17. The system of claim 12, wherein the particular sequence is selected from a plurality of gaming sequences based on an identity of the player.

18. A method of gaming, comprising receiving player information from one of a plurality of networked gaming activities;

generating a gaming sequence for a group of the plurality of networked gaming activities for a player to play at, based on the received player information;

requiring the player to be physically present at each of the plurality of different gaming activities in the gaming sequence;

sending configuration information based on the generated gaming sequence to the one of the plurality of networked gaming activities;

receiving accumulated win information from the one of the plurality of networked gaming activities; and sending information pertaining to a next gaming activity in the generated gaming sequence to the one of the plurality of networked gaming activities.

19. The method of claim 18, wherein the step of generating the gaming sequence includes the step of generating the gaming sequence to include a plurality of gaming activities, each of which is associated with a different physical location.

20. The method of claim 19, wherein a plurality of the different physical locations are associated with a plurality of different business entities.

* * * * *